United States Patent
Hsieh et al.

(10) Patent No.: US 8,885,525 B2
(45) Date of Patent: Nov. 11, 2014

(54) METHOD AND APPARATUS FOR SOFT BUFFER PARTITIONING IN TIME-DIVISION DUPLEXING SYSTEM

(75) Inventors: Chia-Wen Hsieh, Chiayi (TW); Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 2 days.

(21) Appl. No.: 13/551,614

(22) Filed: Jul. 18, 2012

(65) Prior Publication Data
US 2013/0051289 A1 Feb. 28, 2013

Related U.S. Application Data

(60) Provisional application No. 61/527,104, filed on Aug. 24, 2011.

(51) Int. Cl.
*H04J 3/00* (2006.01)
*H04L 1/18* (2006.01)

(52) U.S. Cl.
CPC ............ *H04L 1/1845* (2013.01); *H04L 1/1822* (2013.01)
USPC ......................................................... 370/280

(58) Field of Classification Search
USPC .................... 370/394, 280, 329, 328; 714/748
See application file for complete search history.

(56) References Cited

U.S. PATENT DOCUMENTS

| 7,797,605 B2 * | 9/2010 | Garrett et al. .................. 714/748 |
| 7,839,813 B2 * | 11/2010 | Kim et al. ...................... 370/322 |
| 8,285,330 B2 * | 10/2012 | Lee et al. ....................... 455/560 |
| 8,286,047 B2 * | 10/2012 | Che et al. ....................... 714/751 |
| 8,340,121 B2 * | 12/2012 | Mohanty et al. ............... 370/464 |
| 8,341,484 B2 * | 12/2012 | Parkvall et al. ................ 714/749 |
| 2009/0232050 A1 * | 9/2009 | Shen et al. ..................... 370/328 |
| 2010/0050034 A1 * | 2/2010 | Che et al. ....................... 714/748 |
| 2010/0296427 A1 * | 11/2010 | Lohr et al. ..................... 370/312 |
| 2010/0312994 A1 * | 12/2010 | McBeath et al. .............. 712/220 |

(Continued)

FOREIGN PATENT DOCUMENTS

| EP | 1699158 | 9/2006 |
| WO | 2011035109 | 3/2011 |

OTHER PUBLICATIONS

Investigation on Rate Matching and Soft Buffer Splitting for LTE-Advanced Carrier Aggregation, Takeda, Kazuaki, Sagae, Yuta, Ohkubo, Naoto, and Ishii, Hiroyuki, 978-1-4673-0990-5/12/$31.00 © 2012 IEEE.*

(Continued)

*Primary Examiner* — Mark Rinehart
*Assistant Examiner* — Peter Solinsky
(74) *Attorney, Agent, or Firm* — Jianq Chyun IP Office

(57) ABSTRACT

A method for partitioning a soft buffer in a time-division duplex system and an apparatus using the same are disclosed. The method includes the following steps. A total number of soft channel bits, a maximum number of transport blocks transmittable to a user equipment (UE) in a transmission time interval (TTI), a maximum number of downlink (DL) hybrid automatic retransmit request (HARQ) processes, and a configured maximum number of HARQ processes are determined. A partition size of the soft buffer is selected according at least to the total number of soft channel bits, the maximum number of transport blocks transmittable to the UE in the TTI, the maximum number of DL HARQ processes, and the preconfigured maximum number of HARQ processes.

65 Claims, 18 Drawing Sheets

Table 1

| | Total number of soft channel bits ($N_{soft}$) | Maximum number of supported layers for spatial multiplexing in DL |
|---|---|---|
| Category 1 | 250368 | 1 |
| Category 2 | 1237248 | 2 |
| Category 3 | 1237248 | 2 |
| Category 4 | 1827072 | 2 |
| Category 5 | 3667200 | 4 |

Table 2

| Duplex mode | | Maximum number of HARQ ($M_{DL\_HARQ}$) |
|---|---|---|
| FDD | | 8 |
| TDD | UL/DL configuration 0 | 4 |
| | UL/DL configuration 1 | 7 |
| | UL/DL configuration 2 | 10 |
| | UL/DL configuration 3 | 9 |
| | UL/DL configuration 4 | 12 |
| | UL/DL configuration 5 | 15 |
| | UL/DL configuration 6 | 6 |

(56) References Cited

U.S. PATENT DOCUMENTS

| | | | |
|---|---|---|---|
| 2011/0066912 A1* | 3/2011 | Riess et al. .................. | 714/751 |
| 2012/0057529 A1* | 3/2012 | Seo et al. .................... | 370/328 |
| 2012/0087396 A1* | 4/2012 | Nimbalker et al. ........... | 375/219 |
| 2012/0113929 A1* | 5/2012 | Lee et al. .................... | 370/329 |
| 2012/0120889 A1* | 5/2012 | Cheng et al. ................. | 370/329 |
| 2012/0176887 A1* | 7/2012 | Mcbeath et al. ............. | 370/216 |
| 2012/0188952 A1* | 7/2012 | Baldemair et al. ........... | 370/329 |
| 2012/0275397 A1* | 11/2012 | Hsieh et al. .................. | 370/329 |
| 2012/0300699 A1* | 11/2012 | Kamuf et al. ................. | 370/328 |
| 2013/0051289 A1* | 2/2013 | Hsieh et al. .................. | 370/280 |
| 2013/0188510 A1* | 7/2013 | Siomina et al. .............. | 370/252 |
| 2013/0215865 A1* | 8/2013 | Lee et al. ..................... | 370/329 |
| 2013/0250822 A1* | 9/2013 | Yang et al. ................... | 370/280 |
| 2013/0322307 A1* | 12/2013 | Yang et al. ................... | 370/280 |
| 2013/0329612 A1* | 12/2013 | Seo et al. ..................... | 370/280 |
| 2013/0343242 A1* | 12/2013 | Yang et al. ................... | 370/280 |
| 2014/0016519 A1* | 1/2014 | Kim et al. .................... | 370/280 |
| 2014/0078941 A1* | 3/2014 | Seo et al. ..................... | 370/280 |

OTHER PUBLICATIONS

"Soft Buffer Allocation for CA", NTT DOCOMO, 3GPP TSG RAN WG1 Meeting #64 R1-110860, Feb. 21-25, 2011, pp. 1-11.

"Soft Buffer Partitioning for Carrier Aggregation", Motorola Mobility, 3GPP TSG RAN WG1 #64 R1-110873, Feb. 21-25, 2011, pp. 1-6.

"Soft buffer partitioning for CA", Qualcomm Incorporated, 3GPP TSG-RAN WG1 #64 R1-110911, Jan. 21-25, 2011, pp. 1-11.

"Summary of Adhoc session on Soft Buffer Partitioning for Carrier Aggregation", Motorola Mobility, 3GPP TSG RAN WG1 #64 R1-111159, Feb. 21-25, pp. 1-2.

"Soft buffer handling for Rel-10 UEs", Ericsson, ST-Ericsson, 3GPP TSG RAN WG1 Meeting #65 R1-111322, May 8-13, 2011, pp. 1-9.

"Further evaluation of soft buffer partitioning for CA", NTT DOCOMO, 3GPP TSG RAN WG1 Meeting #65 R1-111633, May 9-13, 2011, pp. 1-10.

"Soft Buffer Partitioning", Motorola Mobility, 3GPP TSG RAN WG1 Meeting #65 R1-111668, May 9-13, 2011, pp. 1-4.

3GPP TS 36.212, "3rd Generation Partnership Project; Technical Specification Group Radio Access Network; Evolved Universal Terrestrial Radio Access (E-UTRA); Multiplexing and channel coding (Release 10)", 3GPP, V10.6.0, Jun. 2012, pp. 1-79.

3GPP TS 36.213, "3rd Generation Partnership Project; Technical Specification Group Radio Access Network; Evolved Universal Terrestrial Radio Access (E-UTRA);Physical layer procedures (Release 10)", 3GPP, V10.6.0, Jun. 2012, pp. 1-125.

3GPP TS 36.211, "3rd Generation Partnership Project; Technical Specification Group Radio Access Network; Evolved Universal Terrestrial Radio Access (E-UTRA); Physical Channels and Modulation (Release 10)", 3GPP, V10.5.0, Jun. 2012, pp. 1-101.

3GPP TS 36.306, "3rd Generation Partnership Project; Technical Specification Group Radio Access Network; Evolved Universal Terrestrial Radio Access (E-UTRA); User Equipment (UE) radio access capabilities (Release 10)", 3GPP, V10.6.0, Jun. 2012, pp. 1-22.

"Office Action of Taiwan Counterpart Application", issued on Sep. 1, 2014, p. 1-p. 10.

* cited by examiner

Table 1

|  | Total number of soft channel bits ($N_{SOFT}$) | Maximum number of supported layers for spatial multiplexing in DL |
|---|---|---|
| Category 1 | 250368 | 1 |
| Category 2 | 1237248 | 2 |
| Category 3 | 1237248 | 2 |
| Category 4 | 1827072 | 2 |
| Category 5 | 3667200 | 4 |

Table 2

| Duplex mode | | Maximum number of HARQ ($M_{DL\_HARQ}$) |
|---|---|---|
| FDD | | 8 |
| TDD | UL/DL configuration 0 | 4 |
| | UL/DL configuration 1 | 7 |
| | UL/DL configuration 2 | 10 |
| | UL/DL configuration 3 | 9 |
| | UL/DL configuration 4 | 12 |
| | UL/DL configuration 5 | 15 |
| | UL/DL configuration 6 | 6 |

FIG. 1

Table 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

METHOD AND APPARATUS FOR SOFT BUFFER PARTITIONING IN TIME-DIVISION DUPLEXING SYSTEM

CROSS-REFERENCE TO RELATED APPLICATION

This application claims the priority benefits of U.S. provisional application Ser. No. 61/527,104, filed on Aug. 24, 2011. The entirety of the above-mentioned patent application is hereby incorporated by reference herein and made a part of this specification.

BACKGROUND

1. Technical Field

The disclosure relates to a partitioning method and apparatus, and more particularly, to a method for partitioning a soft buffer in a time-division duplex (TDD) system and an apparatus using the same.

2. Related Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a radio network architecture that provides a high data rate, low latency, packet optimization, and improved system capacity and coverage. In the LTE system, a radio access network known as an evolved UTRAN (E-UTRAN) includes multiple evolved Node-Bs (eNBs) for communicating with multiple user equipments (UEs), and communicates with a core network including a mobility management entity (MME), a serving gateway, etc., for Non Access Stratum (NAS) control.

A LTE-advanced (LTE-A) system, as its name implies, is an evolution of the LTE system. The LTE-A system targets faster switching between power states, improves performance at coverage edge of an eNB. Besides, the LTE-A system includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Carrier aggregation in the LTE-A system can aggregate more than one component carriers (CCs) to achieve a wider-band transmission. Accordingly, the LTE-A system can support a wider bandwidth up to 100 MHz by aggregating a maximum number of 5 CCs, where a maximum bandwidth of each CC is 20 MHz and is backward compatible with the 3GPP Rel-8 standard. The LTE-A system supports the CA for both contiguous and non-contiguous CCs, wherein each CC limited to a maximum of 110 resource blocks. The CA increases bandwidth flexibility by aggregating the CCs.

When a UE is configured with the CA, the UE has the ability to receive and/or transmit packets on one or multiple configured component carriers (CCs), or namely, serving cells to increase throughput. For frequency-division duplexing (FDD) mode in the LTE-A system, it is possible that an eNB configures the UE different numbers of uplink (UL) and downlink (DL) serving cells. For time-division duplexing (TDD) mode in the LTE-A system, it is possible that an eNB configures the UE multiple serving cells with different TDD UL-DL configurations. Moreover, the serving cells configured to the UE necessarily consists of one DL primary CC (PCC) and one UL PCC for FDD mode; otherwise, the configured serving cells consist of one PCC for TDD mode. Number of the configured secondary cells is arbitrary, and might be related to UL and/or DL aggregation capabilities of the UE and available radio resources.

A hybrid automatic repeat request (HARQ) process is used in the LTE system to provide both efficient and reliable communications. Different from an ARQ process, a forward correcting code (FEC) is used for the HARQ process. For example, a receiver feeds back a positive acknowledgment (ACK) to inform a transmitter that a packet has been received correctly if the receiver decodes the packet correctly. Oppositely, the receiver feeds back a negative acknowledgment (NACK) to the transmitter if the receiver cannot decode the packet correctly. In this situation, the UE stores part or the whole of the packet in a soft buffer of the UE. After the UE receives a retransmitted packet from the transmitter, soft values of the retransmitted packet and the stored packet are combined. The receiver decodes the packet by using the combined soft values. Furthermore, the combination of the previously erroneously received packet(s) and the currently received packet increases a probability of successful decoding. The UE continues the HARQ process until the packet is decoded correctly, or until a maximum number of retransmissions have been sent, at which time the HARQ process declares a failure and leaves it up to the ARQ process in radio link control (RLC) for trying again. In other words, space of the soft buffer should be reserved for the HARQ process such that the UE can store the HARQ process which has not been decoded correctly. Otherwise, the UE blocks the HARQ process if the soft buffer is fully occupied. When multiple packets are transmitted to the UE, the UE may need to store multiple HARQ processes due to unsuccessful decoding of the packets.

SUMMARY

The disclosure provides a method for partitioning a soft buffer in a time-division duplex (TDD) system supporting multiple component carriers (CCs). The TDD system comprises a transceiver and a communication protocol module. According to an exemplary embodiment of the disclosure, the method for partitioning the soft buffer includes the following steps. A total number of soft channel bits, a maximum number of transport blocks transmittable to a user equipment (UE) in a transmission time interval (TTI), a maximum number of downlink (DL) hybrid automatic retransmit request (HARQ) processes, and a preconfigured maximum number of HARQ processes are determined by the communication protocol module. Moreover, a partition size of the soft buffer is selected by the communication protocol module according at least to the total number of soft channel bits, the maximum number of transport blocks transmittable to the UE in the TTI, the maximum number of DL HARQ processes, and the preconfigured maximum number of HARQ processes.

The disclosure provides an apparatus for partitioning a soft buffer in a TDD system supporting multiple serving cells. The apparatus for partitioning the soft buffer includes a transceiver configured for receiving signals and transmitting signals between a UE and a base station. Moreover, the apparatus for partitioning the soft buffer further includes a communication protocol module, connected to the transceiver, configured for determining a total number of soft channel bits, a maximum number of transport blocks transmittable to a UE in a TTI, a maximum number of DL HARQ processes, and a preconfigured maximum number of HARQ processes. Furthermore, the communication protocol module is further configured for selecting a partition size of the soft buffer according at least to the total number of soft channel bits, the maximum number of transport blocks transmittable to the UE in the TTI, the maximum number of DL HARQ processes, and the preconfigured maximum number of HARQ processes.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1 tabulates data corresponding to user equipment categories and uplink/downlink configurations.

DETAILED DESCRIPTION OF DISCLOSED EMBODIMENTS

FIG. 1 tabulates data corresponding to user equipment categories and uplink/downlink configurations. Typically speaking, a UE can store up to 8 HARQ processes in a soft buffer in a LTE system (e.g., single CC system). Each HARQ process carries at least one packet; for example, a packet is a transport block in a LTE system. A transport block (TB) is a data unit transmitted on physical downlink shared channel (PDSCH) from an eNB to at least one UE in a LTE radio subframe. Further, each LTE radio subframe is 1 millisecond (ms), and each LTE radio frame is 10 ms, which consists of 10 LTE radio subframes. When using MIMO (e.g. spatial multiplexing), more than one transport blocks can be transmitted per transmission time interval (TTI) for the UE. A soft buffer partition method in the LTE system (i.e., single CC system) is introduced as follows. With reference to FIG. 1, the total number of soft channel bits, $N_{soft}$ depends on the category of the UE. Table 1 in FIG. 1 lists various values of $N_{soft}$ to facilitate description. $N_{soft}$ can be divided into multiple partitions according to the following equation:

$$N_{IR} = \left\lfloor \frac{N_{soft}}{K_{MIMO} \cdot \min(M_{DL\_HARQ}, M_{limit})} \right\rfloor \quad (1)$$

where $N_{IR}$ is a size of a partition which is used for storing a transport block. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value which equals to 8. $M_{DL\_HARQ}$ is a maximum number of DL HARQ processes, and related to its UL-DL configuration. For example, $M_{DL\_HARQ}$ is set to 8 for frequency-division duplexing (FDD). Values 4, 7, 10, 9, 12, 15 and 6 are used for time-division duplexing (TDD) UL/DL configuration 0, 1, 2, 3, 4, 5 and 6, respectively, as shown in Table 2 of FIG. 1, in which various values of $M_{DL\_HARQ}$ are listed to facilitate description. Furthermore, min(x,y) compares x and y and returns the smaller one of x and y.

As shown in Equation 1, up to $\min(M_{DL\_HARQ}, M_{limit})$ HARQ processes can be stored in the soft buffer. If the spatial multiplexing with $K_{MIMO}$ spatial streams is configured to the UE, each HARQ process consists of $K_{MIMO}$ transport blocks. Therefore, the entire soft buffer is divided into $K_{MIMO}*\min(M_{DL\_HARQ}, M_{limit})$ partitions. Each partition consists of $N_{IR}$ soft channel bits which can be used for storing one transport block.

Figures 2, 3:
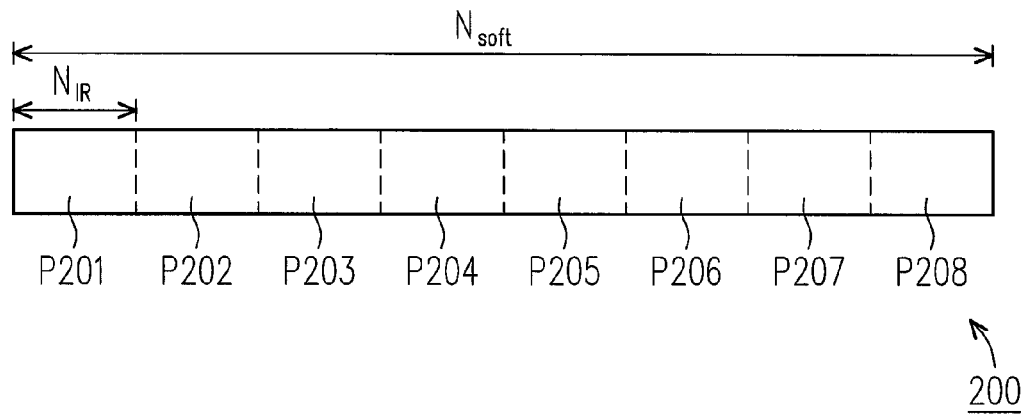
FIG. 2 is a schematic view of a soft buffer in a LTE system.
FIG. 3 tabulates different uplink:downlink ratios corresponding to uplink/downlink configurations.

FIG. 2 is a schematic view of a soft buffer in a LTE system. In this example, transmit diversity is configured to the UE; hence, $K_{MIMO}$ is set to be 1. Referring to FIG. 2, a soft buffer 200 is divided into 8 partitions P201-P208 for storing 8 HARQ processes, while $M_{DL\_HARQ}$ is equal to or larger than 8. $N_{soft}$ is a size (e.g. number of bits) of the soft buffer 200, and depends on the category of the UE. $N_{IR}$ is a number of bits of a partition of the soft buffer 200. Therefore, a transport block with a maximum size $N_{IR}$ can be stored in a corresponding partition, and 8 HARQ processes can be stored in the soft buffer 200.

However, the UE may need to store more than 8 HARQ processes in the soft buffer in the LTE-A system when multiple serving cells are configured to the UE. For example, when the UE is configured with 5 DL serving cells and operates in FDD mode, the UE may need to store up to 40 HARQ processes due to unsuccessful decoding of the packets. In one solution, the soft buffer partition method is the same as that for the LTE system (i.e., the single CC system). In other words, up to 8 HARQ processes can be stored in the soft buffer. All the erroneous HARQ processes can share the soft buffer. Thus, a blocking probability of a HARQ process increases, and the system throughput is diminished. In another solution, the soft buffer can be simply divided into 40 partitions for storing up to 40 HARQ processes, a size of each partition of the soft buffer is reduced. For each erroneous HARQ process, the number of soft channel bits that UE can store is reduced according to the size reduction of a corresponding partition. As a result, the coding performance is reduced and more retransmissions are required, and the system throughput is diminished. Moreover, neither the first nor the second solution can achieve optimal system throughput.

A TDD system features flexible resource utilization through different TDD configurations. Based on the traffic characteristic, different DL:UL ratios can be configured, from 2:3 to 9:1 as specified in a Table 3 in FIG. 3. Each TDD UL-DL configuration has a corresponding maximum number of HARQ processes.

For the 3GPP Rel-10 standard, intra-band CA is supported in TDD mode. Each configured component carrier (CC) is deployed on the same band which has the same UL-DL configuration. Hence, each serving cell has the same maximum number of HARQ processes.

On the other hand, for the 3GPP Rel-11 standard, inter-band CA for TDD system will be supported. Each configured serving cell may be deployed on different bands, and may have different UL-DL configurations. Based on its traffic characteristic, different DL:UL ratios can be configured (from 2:3 to 9:1). Therefore, more flexibility can be achieved in the inter-band CA system by different DL:UL ratios on different serving cells. Since each serving cell may have different UL-DL configurations, the maximum number of HARQ processes corresponding to each serving cell may be different. Therefore, when CA is configured to the UE in TDD mode, how to handle a soft buffer of a UE for storing HARQ processes is a topic to be discussed and addressed.

When a UE is configured with more than one component carriers and at least one serving cell with different UL-DL configuration, a technical challenge is raised in how to efficiently partition the soft buffer to maximize system throughput. In various embodiments hereafter, different methods and apparatuses are presented for partitioning the soft buffer.

Figure 4:
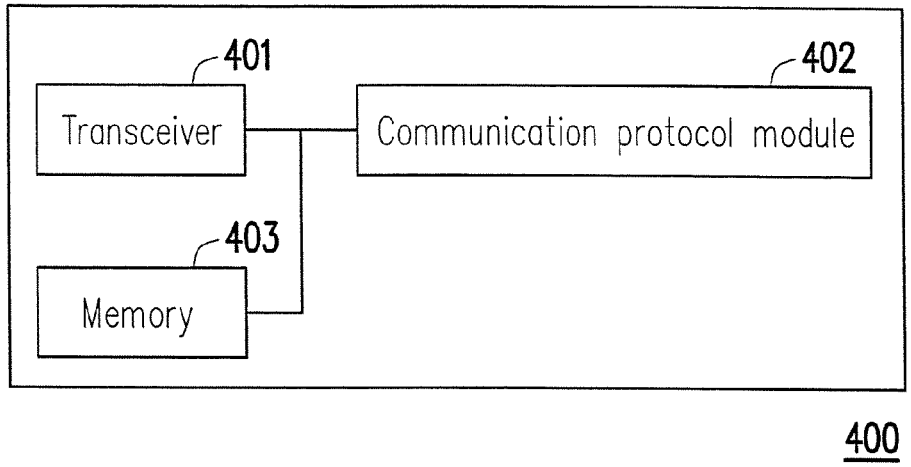
FIG. 4 is a functional block diagram of an apparatus for partitioning a soft buffer in a TDD system supporting multiple serving cells according to an exemplary embodiment of the disclosure.

FIG. 4 is a functional block diagram of an apparatus 400 for partitioning a soft buffer in a TDD system supporting multiple serving cells according to an exemplary embodiment. Referring to FIG. 4, the apparatus 400 may include a transceiver 401, a communication protocol module 402, and a memory 403. The transceiver 401 and the memory 403 are both connected to the communication protocol module 402.

With reference to FIG. 4, the transceiver 401 is configured to transmit and receive signals between a UE and a base station within the coverage range thereof, for example. The transceiver 401 may perform analog-to-digital signal conversion (ADC), digital-to-analog signal conversion (DAC), modulation, demodulation, signal amplification, low-pass filtering, and bandpass filtering. The transceiver 401 is, for example, configured to provide information of a received signal to the communication protocol module 402, modulate data received from the communication protocol module 402 into a modulated signal, and transmit the modulated signal to other devices in the TDD system supporting multiple serving cells.

Figure 5:
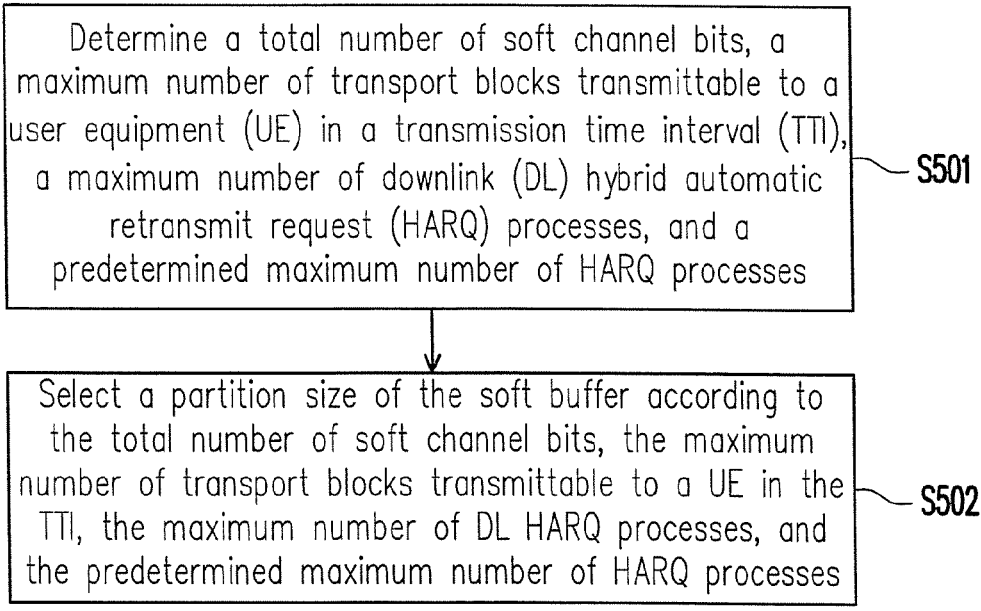
FIG. 5 is a flow diagram of a method for partitioning a soft buffer in a TDD system supporting multiple serving cells according to an exemplary embodiment of the disclosure.

FIG. 5 is a flow diagram of a method for partitioning a soft buffer in a TDD system supporting multiple serving cells according to an exemplary embodiment. In the present embodiment, the communication protocol module 402 is connected to the transceiver 401 and may be configured for executing the steps in the method for partitioning the soft buffer. Referring to FIG. 5, the communication protocol module 402 is configured for determining a total number of soft channel bits, a maximum number of transport blocks transmittable to a UE in a transmission time interval (TTI), a maximum number of downlink (DL) hybrid automatic retransmit request (HARQ) processes, and a preconfigured maximum number of HARQ processes (Step 501). Moreover, the communication protocol module further configured for selecting a partition size of the soft buffer according at least to the total number of soft channel bits, the maximum number of transport blocks transmittable to the UE in the TTI, the maximum number of DL HARQ processes, and the preconfigured maximum number of HARQ processes (Step 502).

It should be noted that, the communication protocol module 402 may include a processor (not drawn) and an embedded software or firmware program. The embedded software or firmware program may include program codes of a communication protocol stack. When the processor of the communication protocol module 402 executes the program codes of the communication protocol stack, the communication protocol module 402 can be configured for executing various procedures in the method for partitioning the soft buffer shown in FIG. 5 and further described later in the disclosure. In addition, the memory 403 may be configured for temporarily storing parameters used in the procedures. The apparatus 400 for partitioning the soft buffer may further include other components (not shown), such as an antenna module to accomplish the aforementioned functions of the transceiver 401, the communication protocol module 402, and the memory 403.

In the disclosure, it should be appreciated that the apparatus 400 for partitioning the soft buffer depicted in FIG. 4 may be part of at least one of a UE, a mobile station (MS), an advanced mobile station (AMS), a wireless terminal communication device, a M2M device, or a MTC device in the TDD system. Moreover, the devices may also be a digital television (TV), a digital set-top box, a personal computer (PC), a notebook computer, a tablet computer, a netbook, a mobile phone, a smart mobile phone, a water meter, a gas meter, a watt-hour meter, an alarm, a sensor, or a monitor. Furthermore, the apparatus 400 for partitioning the soft buffer may be part of at least one of an advanced base station, node B system, or evolved node B (eNB) in the TDD system. It should be further noted that the quantities of the apparatuses for soft buffer partition or the component carriers employed are not restricted to the numbers used in the disclosure, which are only for illustrative purposes and should not be construed as limiting the scope of the disclosure. For instance, in other embodiments of the disclosure, there may be an arbitrary number of apparatuses 400 for partitioning the soft buffer, and more than one component carrier employed in the TDD system, and accordingly those skilled in the art can adjust the methods and apparatuses disclosed herein to suit a particular situation.

In the disclosure hereafter, methods and apparatuses for partitioning the soft buffer are described with reference to the accompanying figures, in which the same reference numerals are used for the same components. According to some embodiments of the disclosure, each serving cell has a dedicated sub-block. In a first embodiment, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot \sum_{i=1}^{N_C} \min(M_{DL\_HARQ}(i), M_{limit})} \right\rfloor \quad (2)$$

where $N_{IR}$ is a size of a partition used for storing a transport block of each serving cell. $N_C$ is the number of configured serving cell to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. The preconfigured maximum number of HARQ processes, $M_{limit}$, is a positive value. $M_{DL\_HARQ}(i)$ is a maximum number of DL HARQ processes of the i-th serving cell, and related to its UL-DL configuration where $1 \le i \le N_C$, i being a positive integer.

Figure 6:
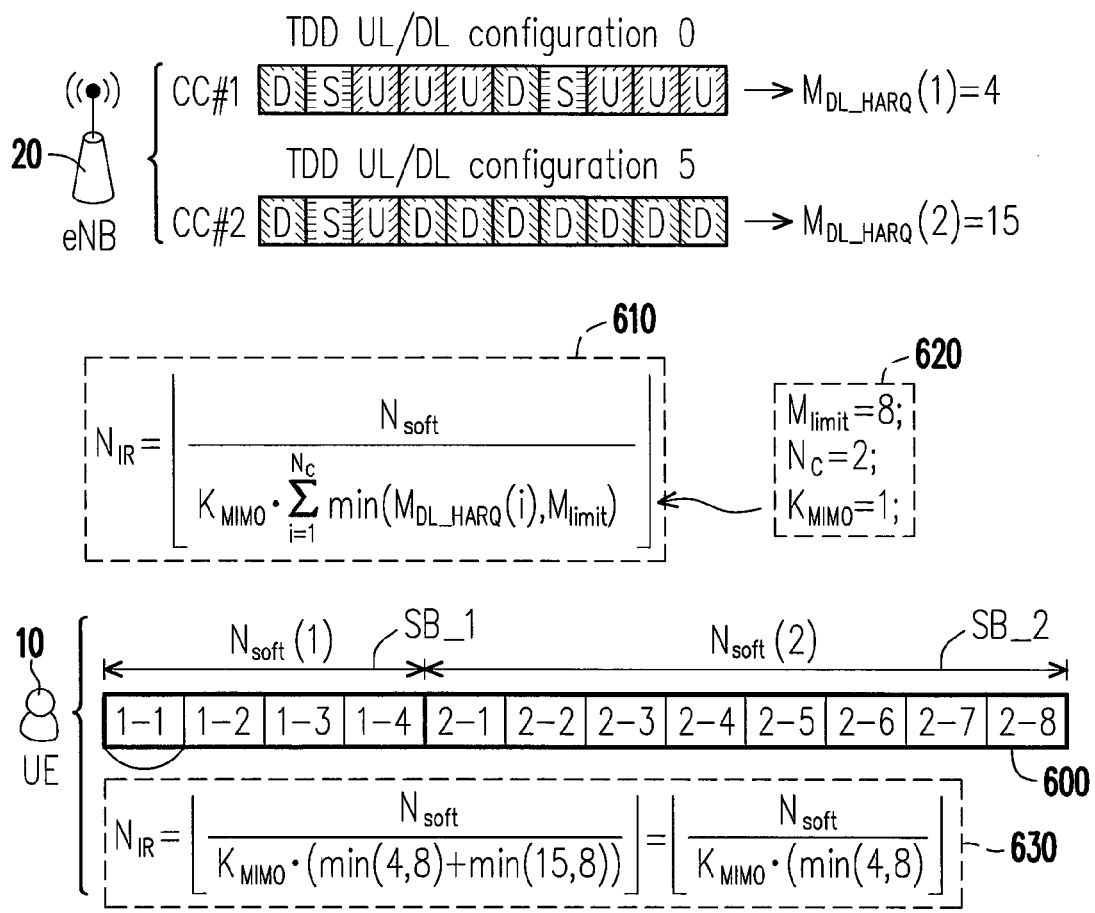
FIG. 6 is a schematic view of a soft buffer partitioned according to a first embodiment of the disclosure.

FIG. 6 is a schematic view of a soft buffer 600 partitioned according to the first embodiment of the disclosure. In this embodiment, for example, $M_{limit}$ is a positive value which equals to 8. A UE 10 is configured 2 serving cells by a network in a TDD system. In an eNB 20, CC#1 is configured with UL-DL configuration #0 and CC#2 is configured with UL-DL configuration #5, and CC#1 is a primary CC (PCC) and CC#2 is a secondary CC (SCC). In this embodiment, for example, transmit diversity is configured to UE 10; hence, $K_{MIMO}$ is set to be 1. The UE 10 divides the soft buffer 600 into two sub-blocks SB_1 and SB_2 for the configured serving cells, respectively, such that up to $M_{limit}$ DL HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 600 is $N_{soft}$. Sizes of the sub-blocks SB_1 and SB_2 are $N_{soft}(1)$ and $N_{soft}(2)$. The sub-blocks SB_1 and SB_2 are used for the HARQ processes of the PCC and the SCC, respectively. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 600 used for storing a transport block is $$N_{IR} = \left\lfloor \frac{N_{soft}}{K_{MIMO} \cdot ((\min(4, 8) + \min(15, 8))} \right\rfloor = \left\lfloor \frac{N_{soft}}{K_{MIMO} \cdot (4 + 8)} \right\rfloor$$

as shown in boxes 610-630 of FIG. 6. In this example, each configured serving cell has the same buffer size for the TB, and each configured serving cell has its own sub-block.

According to a second embodiment of the disclosure, the preconfigured maximum number of HARQ processes, or $M_{limit}$, is infinity. A method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot \sum_{i=1}^{N_C} M_{DL\_HARQ}(i)} \right\rfloor \quad (3)$$

where $N_{IR}$ is a size of a partition used for storing a transport block. $N_C$ is the number of configured serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{DL\_HARQ}(i)$ is a maximum number of DL HARQ processes of the i-th serving cell, and related to its UL-DL configuration where $1 \le i \le N_C$, i being a positive integer.

Figure 7:
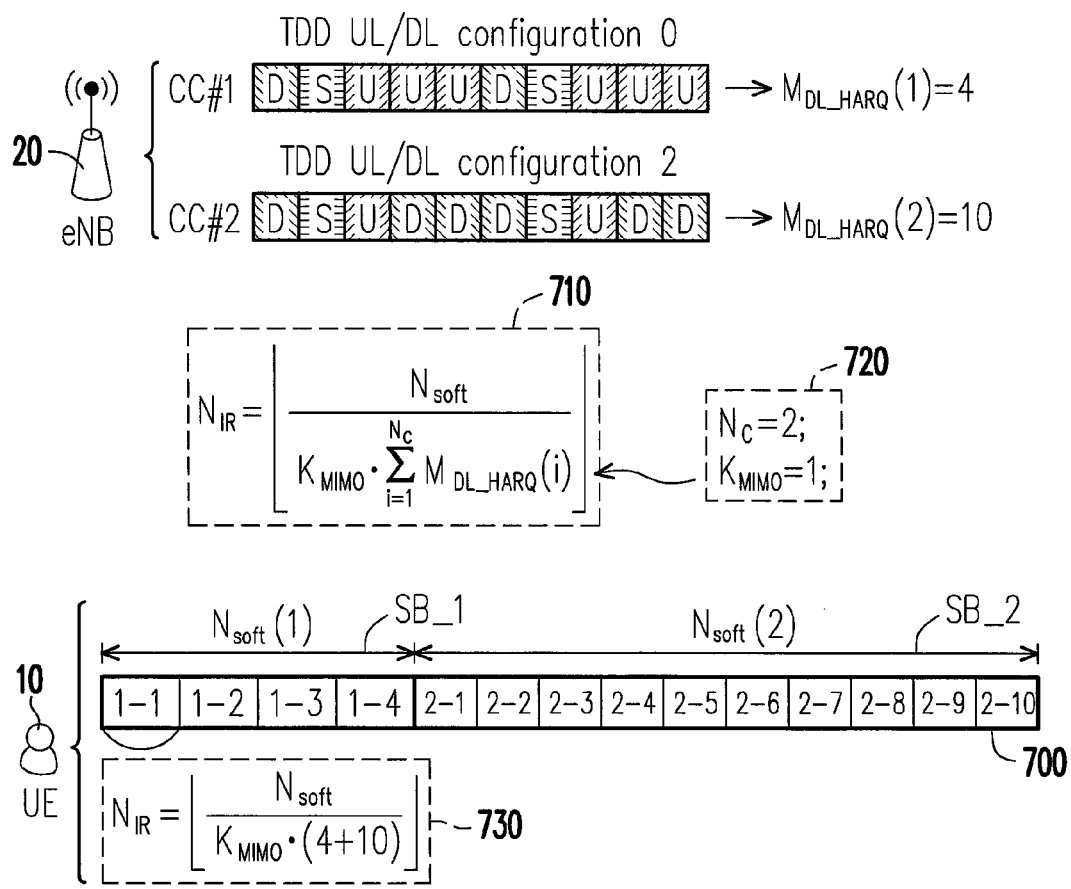
FIG. 7 is a schematic view of a soft buffer partitioned according to a second embodiment of the disclosure.

FIG. 7 is a schematic view of a soft buffer 700 partitioned according to the second embodiment of the disclosure. The UE 10 is configured 2 serving cells by a network in a TDD system. In the eNB 20, CC#1 is configured with UL-DL configuration #0 and CC#2 is configured with UL-DL configuration #2, and CC#1 is a PCC and CC#2 is a SCC. In this embodiment, for example, transmit diversity is configured to UE 10; hence, $K_{MIMO}$ is set to be 1. The UE 10 divides the soft buffer 700 into two sub-blocks SB_1 and SB_2 for the configured serving cells, respectively, such that $M_{DL\_HARQ}(i)$ HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 700 is $N_{soft}$. Sizes of the sub-blocks SB_1 and SB_2 are $N_{soft}(1)$ and $N_{soft}(2)$. The sub-blocks SB_and SB_2 are used for the HARQ processes of the PCC and the SCC, respectively. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 700 used for storing a transport block is $$N_{IR} = \left\lfloor \frac{N_{soft}}{K_{MIMO} \cdot (4 + 10)} \right\rfloor$$

as shown in boxes 710-730 of FIG. 7. In this example, each serving cell has the same buffer size for the TB, and each serving cell has its own sub-block.

According to a third embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR}(i) = \left\lfloor \frac{N_{soft}(i)}{K_{MIMO} \cdot \min(M_{DL\_HARQ}(i), M_{limit})} \right\rfloor \quad (4)$$

where $i = 1, \ldots, N_C$ where $N_{IR}(i)$ is a size of a partition used for storing a transport block of the i-th serving cell, i being a positive integer. $N_C$ is the number of serving cells to the UE. $N_{soft}(i)$ is the number of soft channel bits of the i-th serving cell of the UE and the value of $N_{soft}(i)$ is configured by higher-layer signalling or determined by a predefined function. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ}(i)$ is a maximum number of DL HARQ processes of the i-th serving cell, and related to its UL-DL configuration where $1 \le i \le N_C$.

Figure 8:
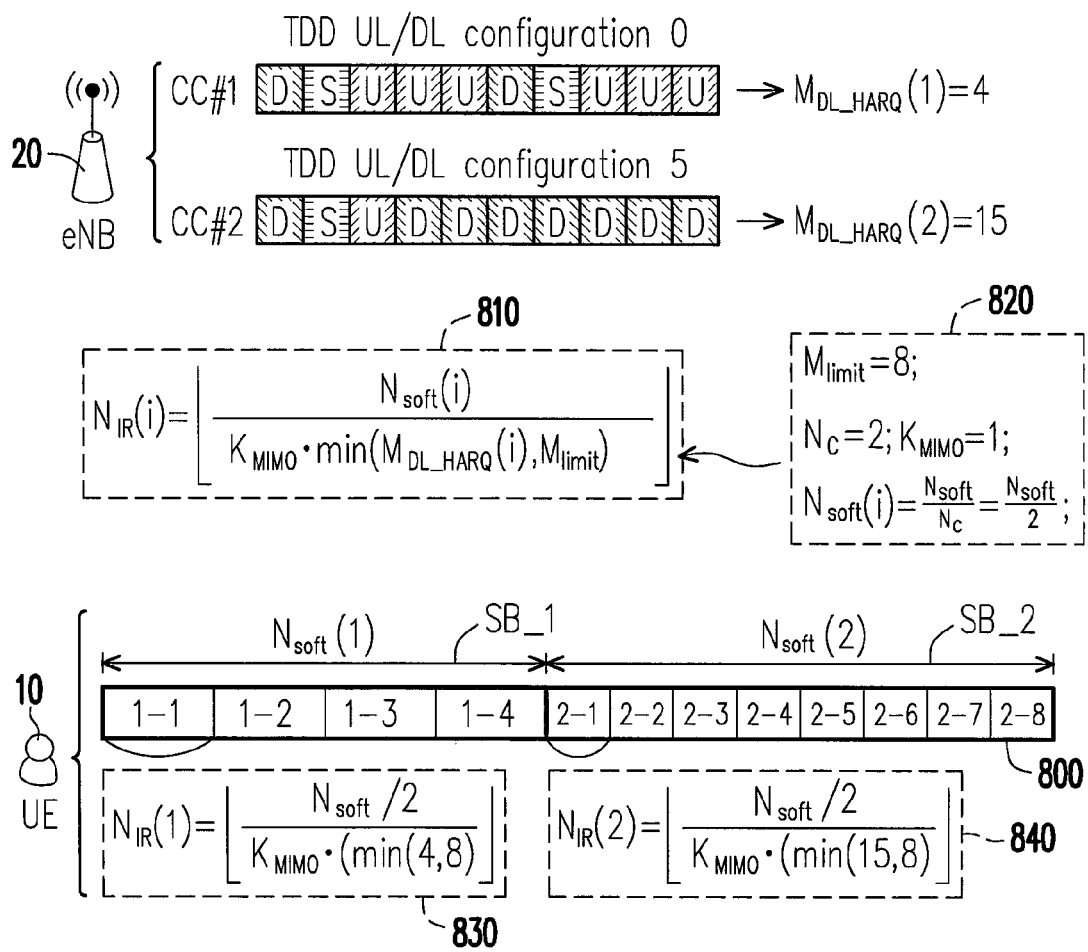
FIG. 8 is a schematic view of a soft buffer partitioned according to a third embodiment of the disclosure.

FIG. 8 is a schematic view of a soft buffer 800 partitioned according to the third embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration#0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The UE 10 divides the soft buffer 800 into two sub-blocks SB_1 and SB_2 for the serving cells, respectively, such that up to $M_{limit}$ DL HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 800 is $N_{soft}$. Sizes of the sub-blocks SB_1 and SB_2 are $N_{soft}(1)$ and $N_{soft}(2)$. In this embodiment, for example, $N_{soft}(1)=N_{soft}(2)=N_{soft}/2$. The sub-blocks SB_1 and SB_2 are used for the HARQ processes of the PCC and the SCC, respectively. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 800 used for storing a transport block of the i-th serving cell is $N_{IR}(i)$, where $$N_{IR}(1) = \left\lfloor \frac{N_{soft}/2}{K_{MIMO} \cdot \min(4, 8)} \right\rfloor \text{ and } N_{IR}(2) = \left\lfloor \frac{N_{soft}/2}{K_{MIMO} \cdot \min(15, 8)} \right\rfloor,$$

as shown in boxes 810-840 of FIG. 8. In this example, the TB has cell-specific buffer size, and each serving cell has its own sub-block.

According to a fourth embodiment of the disclosure, the preconfigured maximum number of HARQ processes, or $M_{limit}$, is infinity. A method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR}(i) = \left\lfloor \frac{N_{soft}(i)}{K_{MIMO} \cdot M_{DL\_HARQ}(i)} \right\rfloor \qquad (5)$$

where $i = 1, \ldots, N_C$ where $N_{IR}(i)$ is a size of a partition used for storing a transport block of the i-th serving cell, i being a positive integer. $N_C$ is the number of serving cells to the UE. $N_{soft}(i)$ is the number of soft channel bits of the i-th serving cell of the UE and the value of $N_{soft}(i)$ is configured by higher-layer signalling or determined by a predefined function. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{DL\_HARQ}(i)$ is a maximum number of DL HARQ processes of the i-th serving cell, and related to its UL-DL configuration where $1 \leq i \leq N_C$.

Figure 9:
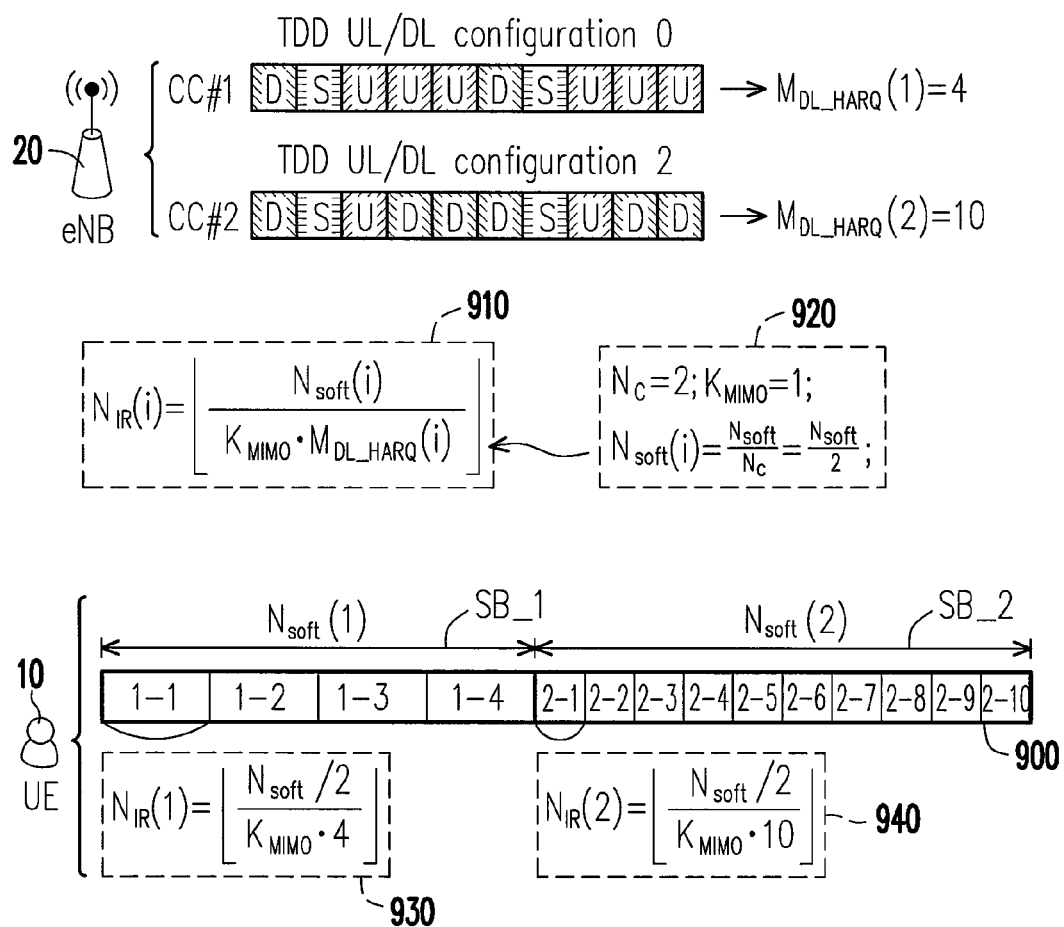
FIG. 9 is a schematic view of a soft buffer partitioned according to a fourth embodiment of the disclosure.

FIG. 9 is a schematic view of a soft buffer 900 partitioned according to the fourth embodiment of the disclosure. In this embodiment, for example, $M_{limit}$ is infinity. The UE 10 is configured 2 serving cells by a network in a TDD system. In the eNB 20, CC#1 is configured with UL-DL configuration #0 and CC#2 is configured with UL-DL configuration #2, and CC#1 is a PCC and CC#2 is a SCC. In this embodiment, for example, transmit diversity is configured to UE 10; hence, $K_{MIMO}$ is set to be 1. The UE 10 divides the soft buffer 900 into two sub-blocks SB_1 and SB_2 for the serving cells, respectively, such that $M_{DL}$ HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 900 is $N_{soft}$. Sizes of the sub-blocks SB_1 and SB_2 are $N_{soft}(1)$ and $N_{soft}(2)$. In this embodiment, for example, $N_{soft}(1)=N_{soft}(2)=N_{soft}/2$. The sub-blocks SB_1 and SB_2 are used for the HARQ processes of the PCC and the SCC, respectively. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 900 used for storing a transport block of the i-th serving cell is $N_{IR}(i)$, where $$N_{IR}(1) = \left\lfloor \frac{N_{soft}/2}{K_{MIMO} \cdot 4} \right\rfloor \text{ and } N_{IR}(2) = \left\lfloor \frac{N_{soft}/2}{K_{MIMO} \cdot 10} \right\rfloor,$$

as shown in boxes 910-940 of FIG. 9. In this example, the TB has cell-specific buffer size, and each serving cell has its own sub-block.

In a fifth embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot \min\left(\sum_{i=1}^{N_C} M_{DL\_HARQ}(i), K_{limit}\right)} \right\rfloor \qquad (6)$$

where $N_{IR}$ is a size of a partition used for storing a transport block of each serving cell. $N_C$ is the number of serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $K_{limit}$ is a positive value. $M_{DL\_HARQ}(i)$ is a maximum number of DL HARQ processes of the i-th serving cell, and related to its UL-DL configuration where $1 \leq i \leq N_C$, i being a positive integer.

Figure 10:
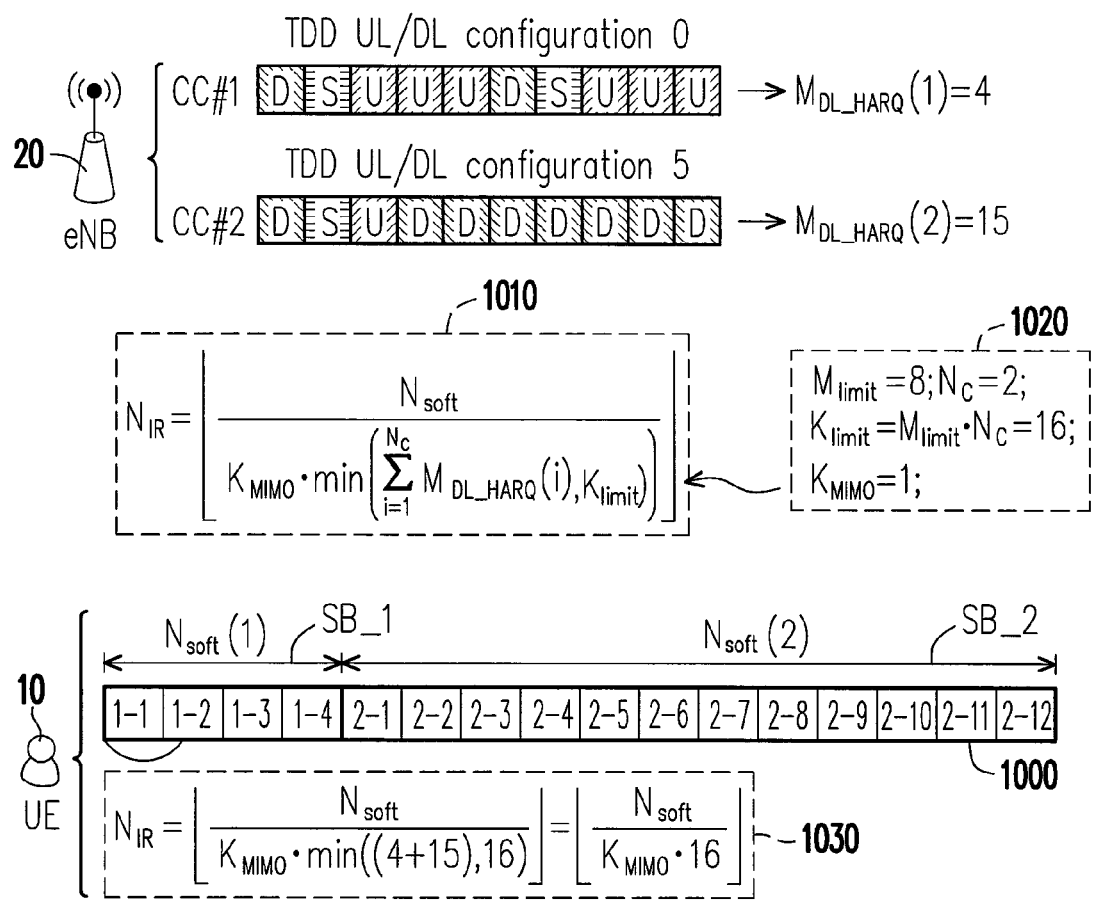
FIG. 10 is a schematic view of a soft buffer partitioned according to a fifth embodiment of the disclosure.

FIG. 10 is a schematic view of a soft buffer 1000 partitioned according to the fifth embodiment of the disclosure. In this embodiment, for example, $M_{limit}$ is a positive value which equals to 8. The UE 10 is configured 2 serving cells by a network in a TDD system. CC#1 is configured with UL-DL configuration#0 and CC#2 is configured with UL-DL configuration#5, wherein CC#1 is a PCC and CC#2 is a SCC. In this embodiment, for example, transmit diversity is configured to UE 10; hence, $K_{MIMO}$ is set to be 1. The UE divides the soft buffer 1000 into two sub-blocks SB_1 and SB_2 for the serving cells, respectively, such that $K_{limit}$ DL HARQ processes can be stored in the soft buffer where $K_{limit}$ is equal to $N_C * M_{limit}$. In this embodiment, for example, $K_{limit}$ is set to be 16. Thus, the UE can arrange HARQ processes of the two serving cells in the sub-blocks SB_1 and SB_2, and each erroneous HARQ process might be arranged to a corresponding partition. In detail, a size (e.g. number of soft channel bits)

of the soft buffer 1000 is $N_{soft}$. Sizes of the sub-blocks SB_1 and SB_2 are $N_{soft}(1)$ and $N_{soft}(2)$. The sub-blocks SB_1 and SB_2 are used for the HARQ processes of the PCC and the SCC, respectively. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1000 used for storing a transport block is $$N_{IR} = \left\lfloor \frac{N_{soft}}{K_{MIMO} \cdot \min((4+15), 16)} \right\rfloor = \left\lfloor \frac{N_{soft}}{K_{MIMO} \cdot 16} \right\rfloor$$

as shown in boxes 1010-1030 of FIG. 10. In this example, each serving cell has the same buffer size for the TB, and each serving cell has its own sub-block.

In a sixth embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR}(i) = \left\lfloor \frac{N_{soft}(i)}{K_{MIMO} \cdot \min(M_{DL\_HARQ\_Max}, M_{limit})} \right\rfloor \quad (7)$$

where $i = 1, \ldots, N_C$ where $N_{IR}(i)$ is a size of a partition used for storing a transport block of the i-th serving cell. $N_C$ is the number of serving cells to the UE. $N_{soft}(i)$ is the total number of soft channel bits of the i-th serving cell of the UE and the value of $N_{soft}(i)$ is configured by higher-layer signalling or determined by a predefined function. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ\_max}$ is an absolute maximum of the maximum number of DL HARQ processes among all the serving cells, which is given by $$M_{DL\_HARQ\_Max} = \arg\max_{j=1,\ldots,N_C} \{M_{DL\_HARQ}(j)\}.$$

Figure 11:
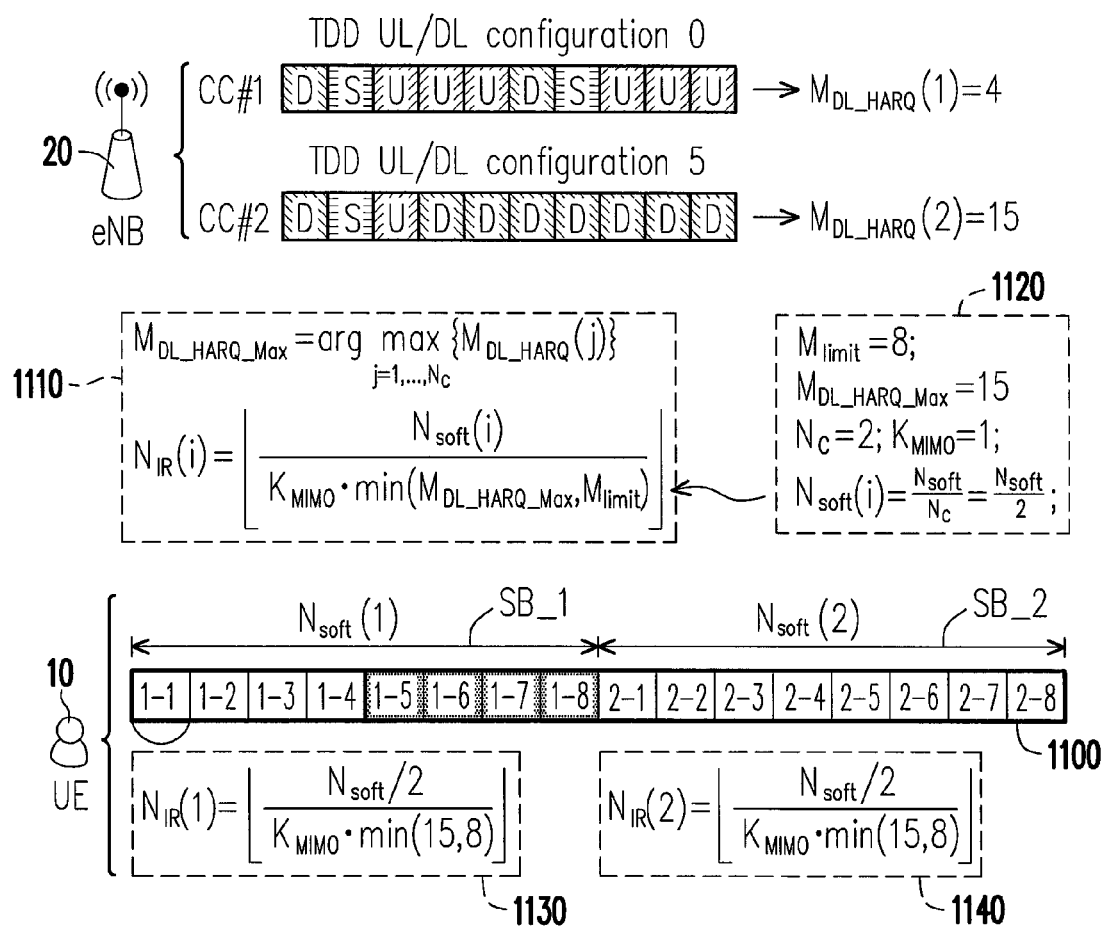
FIG. 11 is a schematic view of a soft buffer partitioned according to a sixth embodiment of the disclosure.

FIG. 11 is a schematic view of a soft buffer 1100 partitioned according to the sixth embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration#5, and CC #1 is a PCC and CC#2 is a SCC. In this embodiment, for example, transmit diversity is configured to UE 10; hence, $K_{MIMO}$ is set to be 1. The absolute maximum of maximum number of DL HARQ processes among all the serving cells, $M_{DL\_HARQ\_max}$, is equal to 15. The UE 10 divides the soft buffer 1100 into two sub-blocks SB_1 and SB_2 for the serving cells, respectively, such that up to $M_{limit}$ DL HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 1100 is $N_{soft}$. Sizes of the sub-blocks SB_1 and SB_2 are $N_{soft}(1)$ and $N_{soft}(2)$. In this embodiment, for example, $N_{soft}(1)=N_{soft}(2)=N_{soft}/2$. The sub-blocks SB_1 and SB_2 are used for the HARQ processes of the PCC and the SCC, respectively. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1100 used for storing a transport block in the i-th sub-block is $N_{IR}(i)$, where $$N_{IR}(1) = \left\lfloor \frac{N_{soft}/2}{K_{MIMO} \cdot \min(15, 8)} \right\rfloor \text{ and } N_{IR}(2) = \left\lfloor \frac{N_{soft}/2}{K_{MIMO} \cdot \min(15, 8)} \right\rfloor,$$

as shown in boxes 1110-1140 of FIG. 11. In this example, the TB has cell-specific buffer size, and each serving cell has its own sub-block.

In a seventh embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR}(i) = \left\lfloor \frac{N_{soft}(i)}{K_{MIMO} \cdot \min(M_{DL\_HARQ\_Min}, M_{limit})} \right\rfloor \quad (8)$$

where $i = 1, \ldots, N_C$ where $N_{IR}(i)$ is a size of a partition used for storing a transport block of the i-th serving cell. $N_C$ is the number of serving cells to the UE. $N_{soft}(i)$ is the total number of soft channel bits of the i-th serving cell of the UE and the value of $N_{soft}(i)$ is configured by higher-layer signalling or determined by a predefined function. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ\_min}$ is an absolute minimum of the maximum number of DL HARQ processes among all the serving cells, which is given by $$M_{DL\_HARQ\_Min} = \arg\max_{j=1,\ldots,N_C} \{M_{DL\_HARQ}(j)\}.$$

Figure 12:
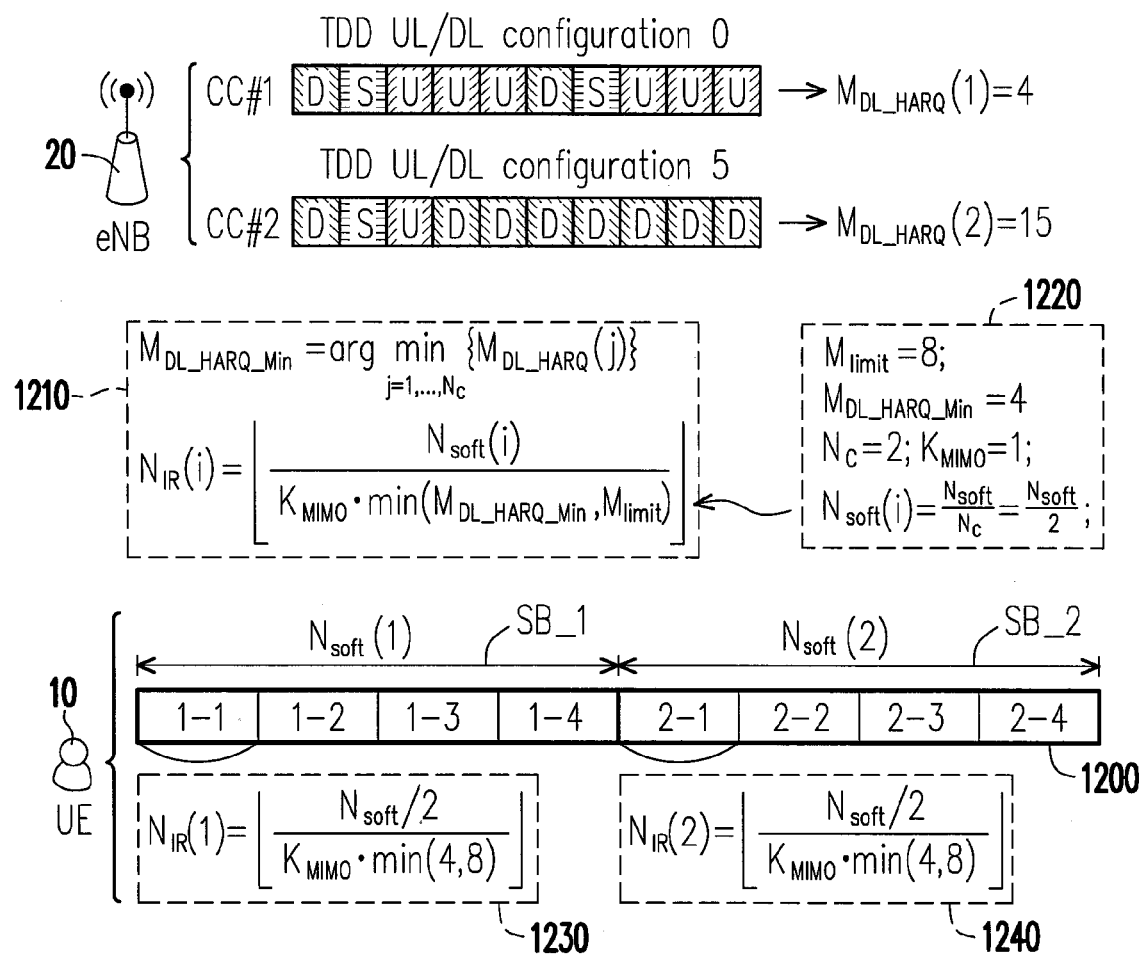
FIG. 12 is a schematic view of a soft buffer partitioned according to a seventh embodiment of the disclosure.

FIG. 12 is a schematic view of a soft buffer 1200 partitioned according to the seventh embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The absolute minimum of maximum number of DL HARQ processes among all the serving cells, $M_{DL\_HARQ\_min}$, is equal to 4. The UE 10 divides the soft buffer 1200 into two sub-blocks SB_1 and SB_2 for the serving cells, respectively, such that $M_{DL\_HARQ\_min}$ DL HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 1200 is $N_{soft}$. Sizes of the sub-blocks SB_1 and SB_2 which are $N_{soft}(1)$ and $N_{soft}(2)$. In this embodiment, for example, $N_{soft}(1)=N_{soft}(2)=N_{soft}/2$. The sub-blocks SB_1 and SB_2 are used for the HARQ processes of the PCC and the SCC, respectively.

In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1200 used for storing a transport block in the i-th sub-block is $N_{IR}(i)$, where $$N_{IR}(1) = \left\lfloor \frac{N_{soft}/2}{K_{MIMO} \cdot \min(4, 8)} \right\rfloor \text{ and } N_{IR}(2) = \left\lfloor \frac{N_{soft}/2}{K_{MIMO} \cdot \min(4, 8)} \right\rfloor,$$

as shown in boxes 1210-1240 of FIG. 12. In this example, the TB has cell-specific buffer size, and each serving cell has its own sub-block.

In an eighth embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR}(i) = \left\lfloor \frac{N_{soft}(i)}{K_{MIMO} \cdot \min(M_{DL\_HARQ\_Avg}, M_{limit})} \right\rfloor \quad (9)$$

where $i = 1, \ldots, N_C$ where $N_{IR}(i)$ is a size of a partition which is used for storing a transport block of the i-th serving cell. $N_C$ is the number of serving cells to the UE. $N_{soft}(i)$ is the total number of soft channel bits of the i-th serving cell of the UE and the value of $N_{soft}(i)$ is configured by higher-layer signalling or determined by a predefined function. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ\_Avg}$ is an average of the maximum number of DL HARQ processes among all the serving cells, which is given by $$M_{DL\_HARQ\_Avg} = \text{floor}\left(\frac{1}{N_C}\sum_{j=1}^{N_C} M_{DL\_HARQ}(j)\right) \text{ or ceil}\left(\frac{1}{N_C}\sum_{j=1}^{N_C} M_{DL\_HARQ}(j)\right).$$

Figure 13:
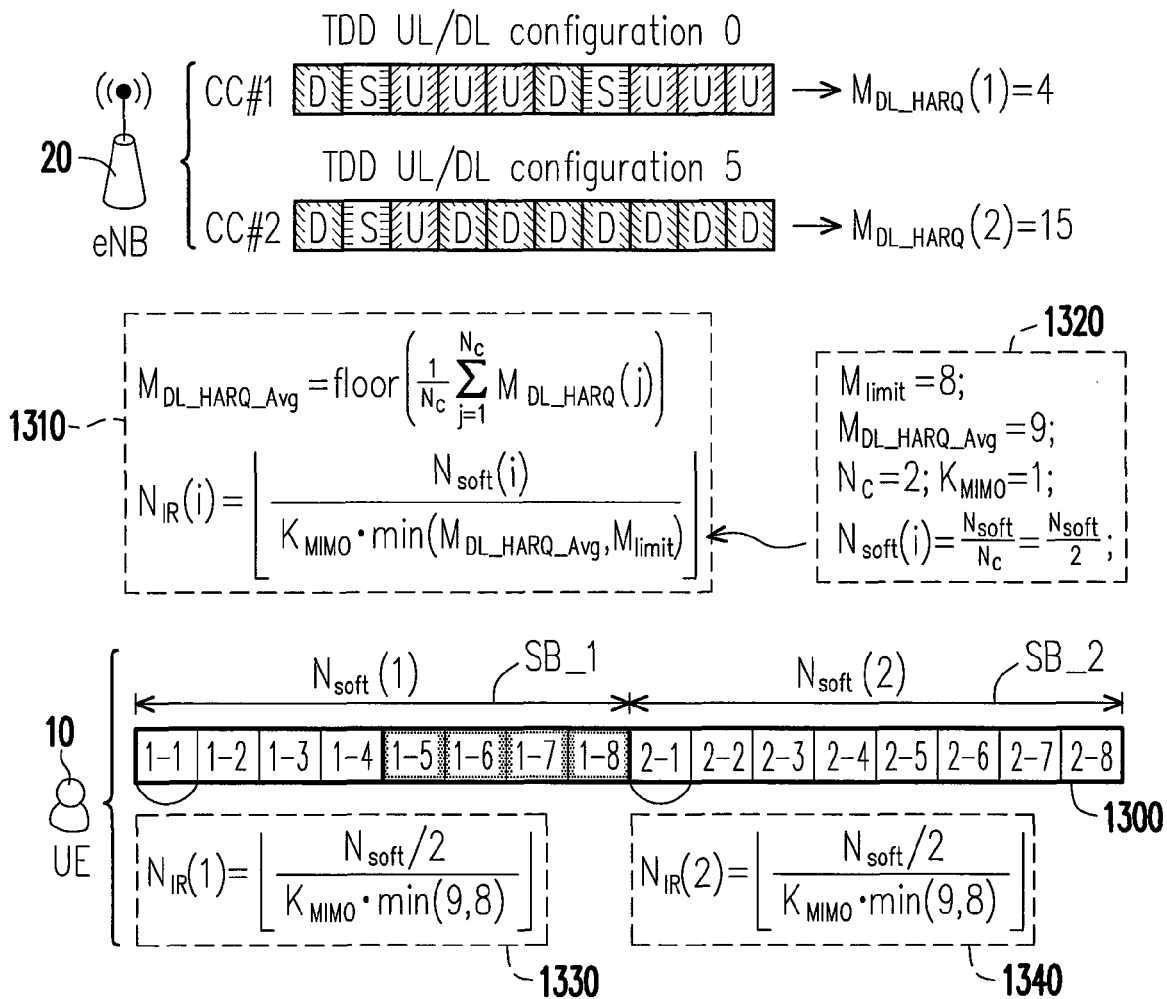
FIG. 13 is a schematic view of a soft buffer partitioned according to an eighth embodiment of the disclosure.

FIG. 13 is a schematic view of a soft buffer 1300 partitioned according to the eighth embodiment of the disclosure. In this embodiment, for example, $M_{limit}$ is a positive value which equals to 8. The UE 10 is configured 2 serving cells by a network in a TDD system. In the enB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The average value of the maximum number of DL HARQ processes among all the serving cells, $M_{DL\_HARQ\_Avg}$, is 9. The UE 10 divides the soft buffer 1300 into two sub-blocks SB_1 and SB_2 for the serving cells, respectively, such that up to $M_{limit}$ DL HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 1300 is $N_{soft}$. Sizes of the sub-blocks SB_1 and SB_2 which are $N_{soft}(1)$ and $N_{soft}(2)$. In this embodiment, for example, $N_{soft}(1)=N_{soft}(2)=N_{soft}/2$. The sub-blocks SB_1 and SB_2 are used for the HARQ processes of the PCC and the SCC, respectively. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1300 used for storing a transport block in the i-th sub-block is $N_{IR}(i)$, where $$N_{IR}(1) = \left\lfloor \frac{N_{soft}/2}{K_{MIMO} \cdot \min(9, 8)} \right\rfloor \text{ and } N_{IR}(2) = \left\lfloor \frac{N_{soft}/2}{K_{MIMO} \cdot \min(9, 8)} \right\rfloor,$$

as shown in boxes 1310-1340 of FIG. 13. In this example, the TB has cell-specific buffer size, and each serving cell has its own sub-block.

In a ninth embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR}(i) = \left\lfloor \frac{N_{soft}(i)}{K_{MIMO} \cdot \min(M_{DL\_HARQ\_PCell}, M_{limit})} \right\rfloor$$

where $i = 1, \ldots, N_C$ (10)

where $N_{IR}(i)$ is a size of a partition which is used for storing a transport block of the i-th serving cell, i being a positive integer. $N_C$ is the number of serving cells to the UE. $N_{soft}(i)$ is the total number of soft channel bits of the i-th serving cell of the UE and the value of $N_{soft}(i)$ is configured by higher-layer signalling or determined by a predefined function. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ\_PCell}$ is the maximum number of DL HARQ processes of a primary serving cell (PCell), which is given by $M_{DL\_HARQ\_PCell}=M_{DL\_HARQ}(j)$ where CC# j is the PCell.

Figure 14:
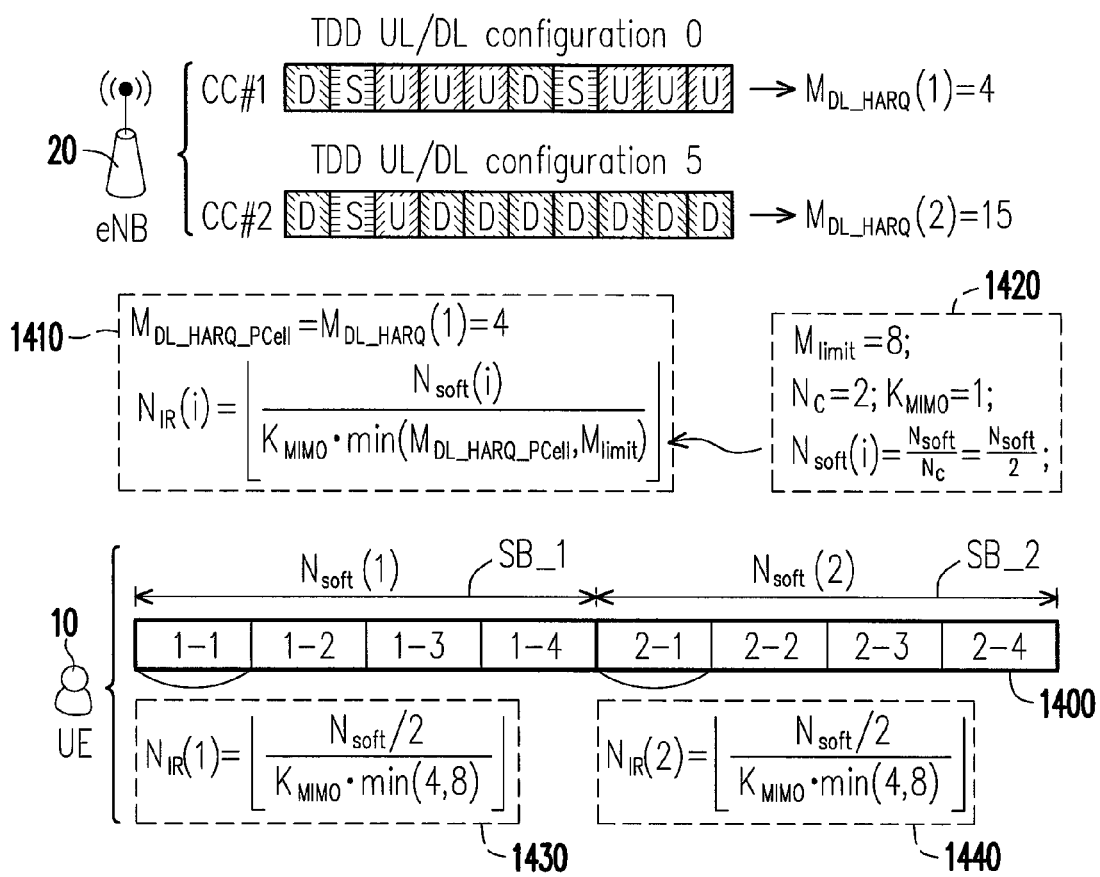
FIG. 14 is a schematic view of a soft buffer partitioned according to a ninth embodiment of the disclosure.

FIG. 14 is a schematic view of a soft buffer 1400 partitioned according to the ninth embodiment of the disclosure. In this embodiment, for example, $M_{limit}$ is a positive value which equals to 8. The UE 10 is configured 2 serving cells by the network and operates in a TDD mode. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The maximum number of DL HARQ processes of the PCell, $M_{DL\_HARQ\_PCell}$, is 4. The UE 10 divides the soft buffer 1400 into two sub-blocks SB_1 and SB_2 for the serving cells, respectively, such that $M_{DL\_HARQ\_PCell}$ DL HARQ processes can be stored in the i-th sub-block. Thus, the UE 10 can arrange HARQ processes of the two serving cells in the sub-blocks SB_1 and SB_2, and each erroneous HARQ process might be arranged to a corresponding partition. In detail, a size (e.g. number of soft channel bits) of the soft buffer 1400 is $N_{soft}$. Sizes of the sub-blocks SB_1 and SB_2 which are $N_{soft}(1)$ and $N_{soft}(2)$. In this embodiment, for example, $N_{soft}(1)=N_{soft}(2)=N_{soft}/2$. The sub-blocks SB_1 and SB_2 are used for the HARQ processes of the PCC and the SCC, respectively. In this embodiment, for example, the maximum number of DL HARQ processes on PCC is determined by PCC UL-DL configuration. Accordingly, the size of each partition of the soft buffer 1400 used for storing a transport block in the i-th sub-block is $N_{IR}(i)$, where $$N_{IR}(1) = \left\lfloor \frac{N_{soft}/2}{K_{MIMO} \cdot \min(4, 8)} \right\rfloor \text{ and } N_{IR}(2) = \left\lfloor \frac{N_{soft}/2}{K_{MIMO} \cdot \min(4, 8)} \right\rfloor,$$

as shown in boxes 1410-1440 of FIG. 14. In this example, the TB has cell-specific buffer size, and each serving cell has its own sub-block.

According to some embodiments of the disclosure, the serving cells share the soft buffer. In a tenth embodiment, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot \sum_{i=1}^{N_C} \min(M_{DL\_HARQ}(i), M_{limit})} \right\rfloor \quad (11)$$

where $N_{IR}$ is a size of a partition which is used for storing a transport block of each serving cell. $N_C$ is the number of serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ}(i)$ is a maximum number of DL HARQ processes of the i-th serving cell, and related to its UL-DL configuration where $1 \leq i \leq N_C$, i being a positive integer.

Figure 15:
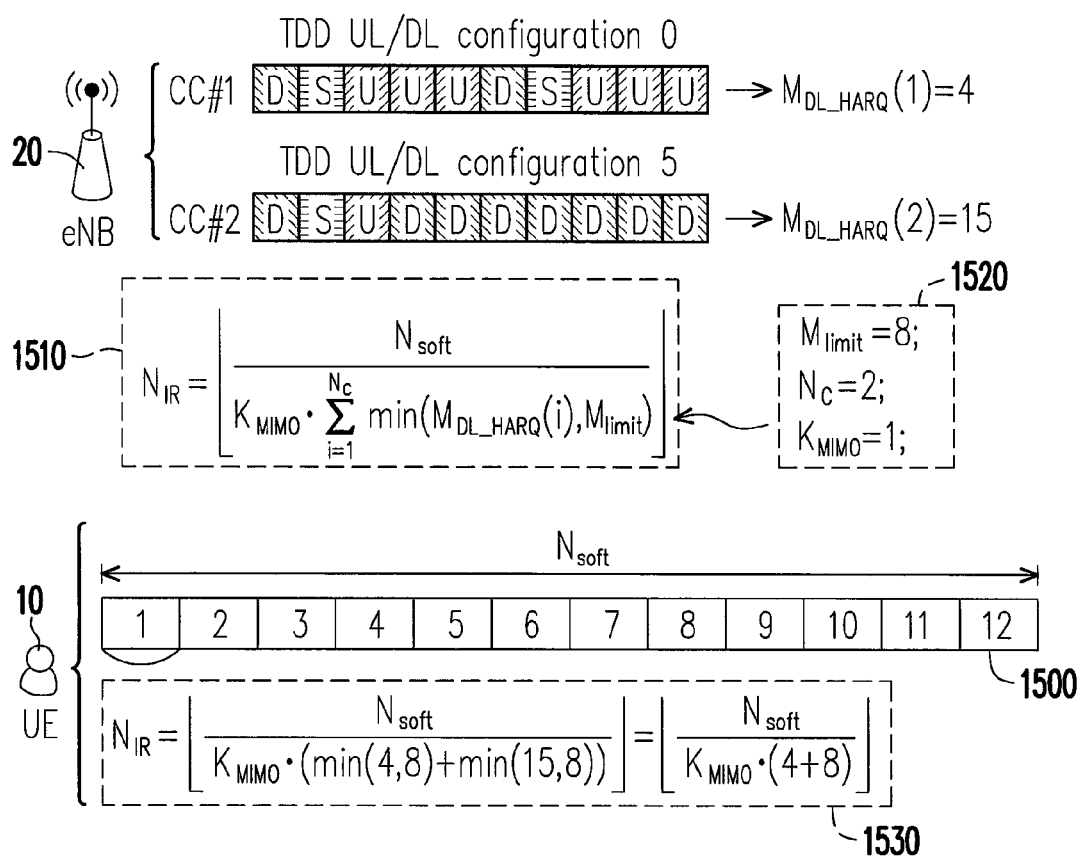
FIG. 15 is a schematic view of a soft buffer partitioned according to a tenth embodiment of the disclosure.

FIG. 15 is a schematic view of a soft buffer 1500 partitioned according to the tenth embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The UE 10 divides soft buffer 1500 into several partitions, and each erroneous HARQ process might be arranged to a corresponding partition. In detail, a size (e.g. number of soft channel bits) of the soft buffer 1500 is $N_{soft}$. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1500 used for storing a transport block is $$N_{IR} = \left\lfloor \frac{N_{soft}}{K_{MIMO} \cdot \min(4, 8) + \min(15, 8)} \right\rfloor = \left\lfloor \frac{N_{soft}}{K_{MIMO} \cdot (4 + 8)} \right\rfloor$$

as shown in boxes 1510-1530 of FIG. 15. In this example, each serving cell has the same buffer size for the TB, and the erroneous HARQ processes from all the serving cells can share the soft buffer.

In a 11th embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot \min\left(\sum_{i=1}^{N_C} M_{DL\_HARQ}(i), K_{limit}\right)} \right\rfloor \quad (12)$$

where $N_{IR}$ is a size of a partition which is used for storing a transport block of each serving cell. $N_C$ is the number of serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $K_{limit}$ is a positive value. $M_{DL\_HARQ}(i)$ is a maximum number of DL HARQ processes of the i-th serving cell, and related to its UL-DL configuration where $1 \leq i \leq N_C$, i being a positive integer.

Figure 16:
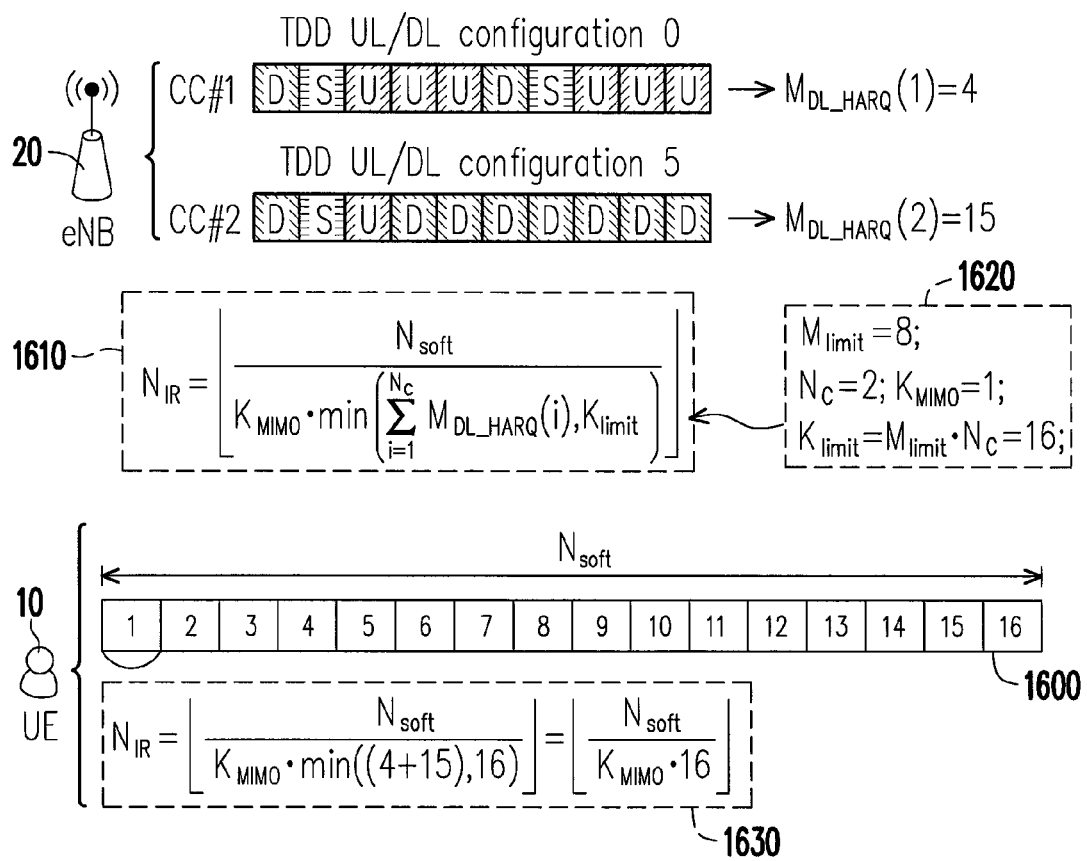
FIG. 16 is a schematic view of a soft buffer partitioned according to an 11$^{th}$ embodiment of the disclosure.

FIG. 16 is a schematic view of a soft buffer 1600 partitioned according to the 11th embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The UE 10 divides soft buffer 1600 into several partitions, and each erroneous HARQ process might be arranged to a corresponding partition. Respectively, $K_{limit}$ DL HARQ processes can be stored in the soft buffer 1600 where $K_{limit}$ is equal to $N_C * M_{limit}$. In this embodiment, for example, $K_{limit}$ is equal to 16. In detail, a size (e.g. number of soft channel bits) of the soft buffer 1600 is $N_{soft}$. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1600 used for storing a transport block is $$N_{IR} = \left\lfloor \frac{N_{soft}}{K_{MIMO} \cdot \min((4 + 15), 16)} \right\rfloor = \left\lfloor \frac{N_{soft}}{K_{MIMO} \cdot 16} \right\rfloor$$

as shown in boxes 1610-1630 of FIG. 16. In this example, each serving cell has the same buffer size for the TB, and the erroneous HARQ processes from all the serving cells can share the soft buffer.

In a 12th embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot (N_C \cdot \min(M_{DL\_HARQ\_Max}, M_{limit}))} \right\rfloor \quad (13)$$

where $N_{IR}$ is a size of a partition used for storing a transport block of each serving cell. $N_C$ is the number of serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ\_max}$ is an absolute maximum of the maximum number of DL HARQ processes among all the serving cells, which is given by $$M_{DL\_HARQ\_Max} = \arg\max_{j=1,\ldots,N_C} \{M_{DL\_HARQ}(j)\}.$$

Figure 17:
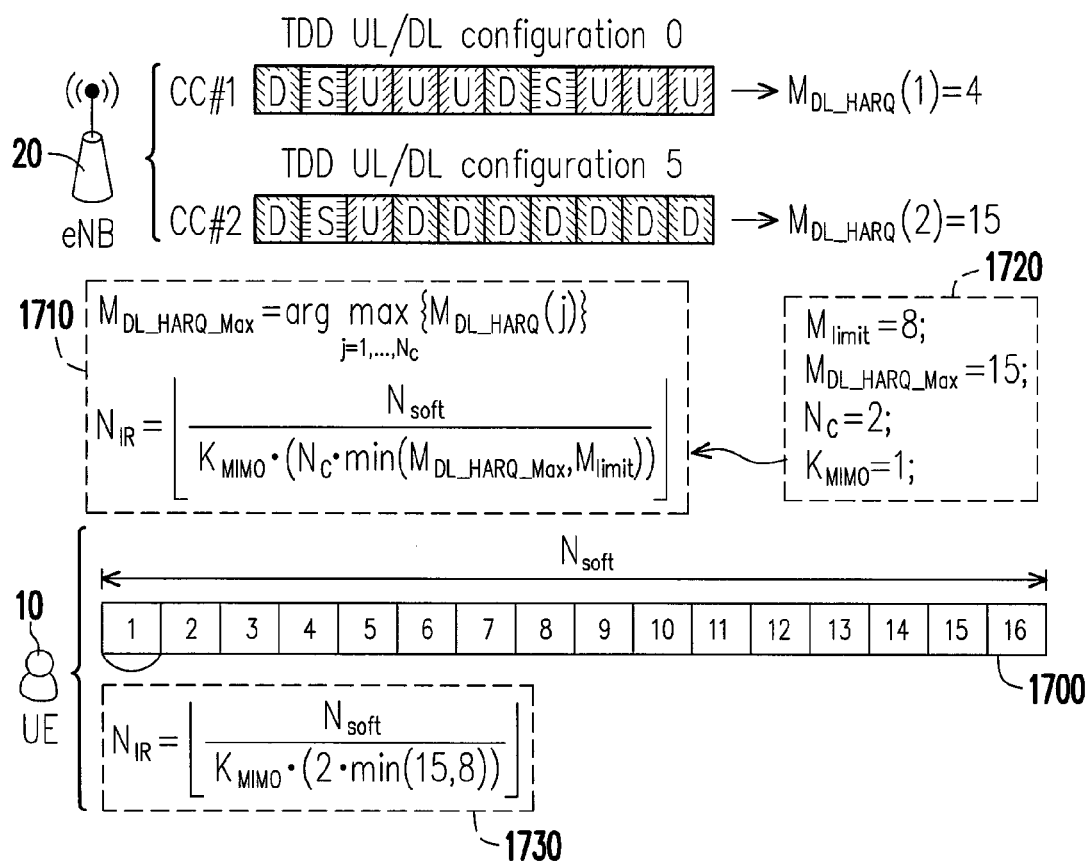
FIG. 17 is a schematic view of a soft buffer partitioned according to a 12$^{th}$ embodiment of the disclosure.

FIG. 17 is a schematic view of a soft buffer 1700 partitioned according to the 12$^{th}$ embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The absolute maximum of the maximum number of DL HARQ processes among all the serving cells, $M_{DL\_HARQ\_max}$, is equal to 15. The UE 10 divides soft buffer 1700 into several partitions, and each erroneous HARQ process might be arranged to a corresponding partition. In detail, a size (e.g. number of soft channel bits) of the soft buffer 1700 is $N_{soft}$. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition which is used for storing a transport block is $$N_{IR} = \left\lfloor \frac{N_{soft}}{K_{MIMO} \cdot (2 \cdot \min(15, 8))} \right\rfloor$$

as shown in boxes 1710-1730 of FIG. 17. In this example, each serving cell has the same buffer size for the TB, and the erroneous HARQ processes from all the serving cells can share the soft buffer.

In a 13$^{th}$ embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot (N_C \cdot \min(M_{DL\_HARQ\_Min}, M_{limit}))} \right\rfloor \quad (14)$$

where $N_{IR}$ is a size of a partition used for storing a transport block of each serving cell. $N_C$ is the number of serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value.

$M_{DL\_HARQ\_Min}$ is an absolute minimum of the maximum number of DL HARQ processes among all the serving cells, which is given by $$M_{DL\_HARQ\_Min} = \arg\min_{j=1,\ldots,N_C} \{M_{DL\_HARQ}(j)\}.$$

Figure 18:
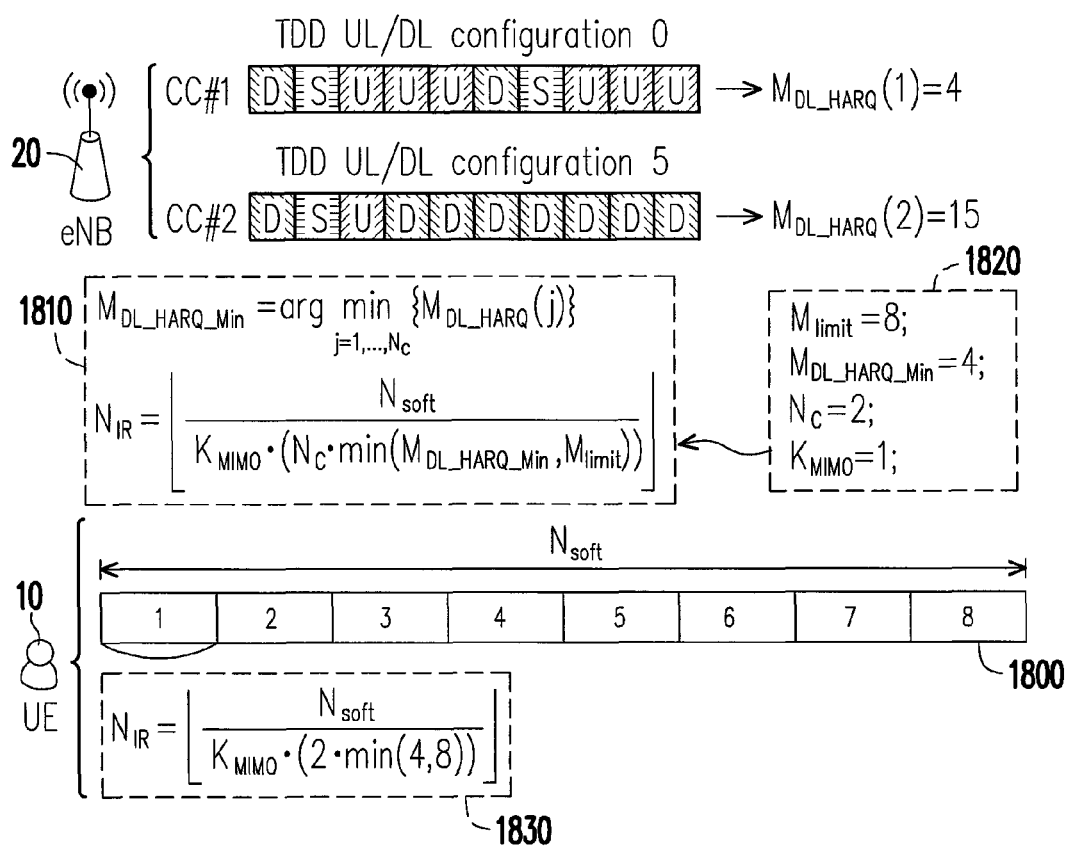
FIG. 18 is a schematic view of a soft buffer partitioned according to a 13$^{th}$ embodiment of the disclosure.

FIG. 18 is a schematic view of a soft buffer 1800 partitioned according to the 13$^{th}$ embodiment of the disclosure. In this embodiment, for example, $K_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The absolute minimum of the maximum number of DL HARQ processes among all the serving cells, $M_{DL\_HARQ\_Min}$, is equal to 4. The UE 10 divides soft buffer 1800 into several partitions, and each erroneous HARQ process might be arranged to a corresponding partition. In detail, a size (e.g. number of soft channel bits) of the soft buffer 1800 is $N_{soft}$. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1800 used for storing a transport block is $$N_{IR} = \left\lfloor \frac{N_{soft}}{K_{MIMO} \cdot (2 \cdot \min(4, 8))} \right\rfloor$$

as shown in boxes 1810-1830 of FIG. 18. In this example, each serving cell has the same buffer size for the TB, and the erroneous HARQ processes from all the serving cells can share the soft buffer.

In a 14$^{th}$ embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot (N_C \cdot \min(M_{DL\_HARQ\_Avg}, M_{limit}))} \right\rfloor \quad (15)$$

where $N_{IR}$ is a size of a partition which is used for storing a transport block of each serving cell. $N_C$ is the number of serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{MIMO}$ is a positive value. $M_{DL\_HARQ\_Avg}$ is an average of the maximum number of DL HARQ processes among all the serving cells, which is given by $$M_{DL\_HARQ\_Avg} = \text{floor}\left(\frac{1}{N_C}\sum_{j=1}^{N_C} M_{DL\_HARQ}(j)\right) \text{ or } \text{ceil}\left(\frac{1}{N_C}\sum_{j=1}^{N_C} M_{DL\_HARQ}(j)\right).$$

Figure 19:
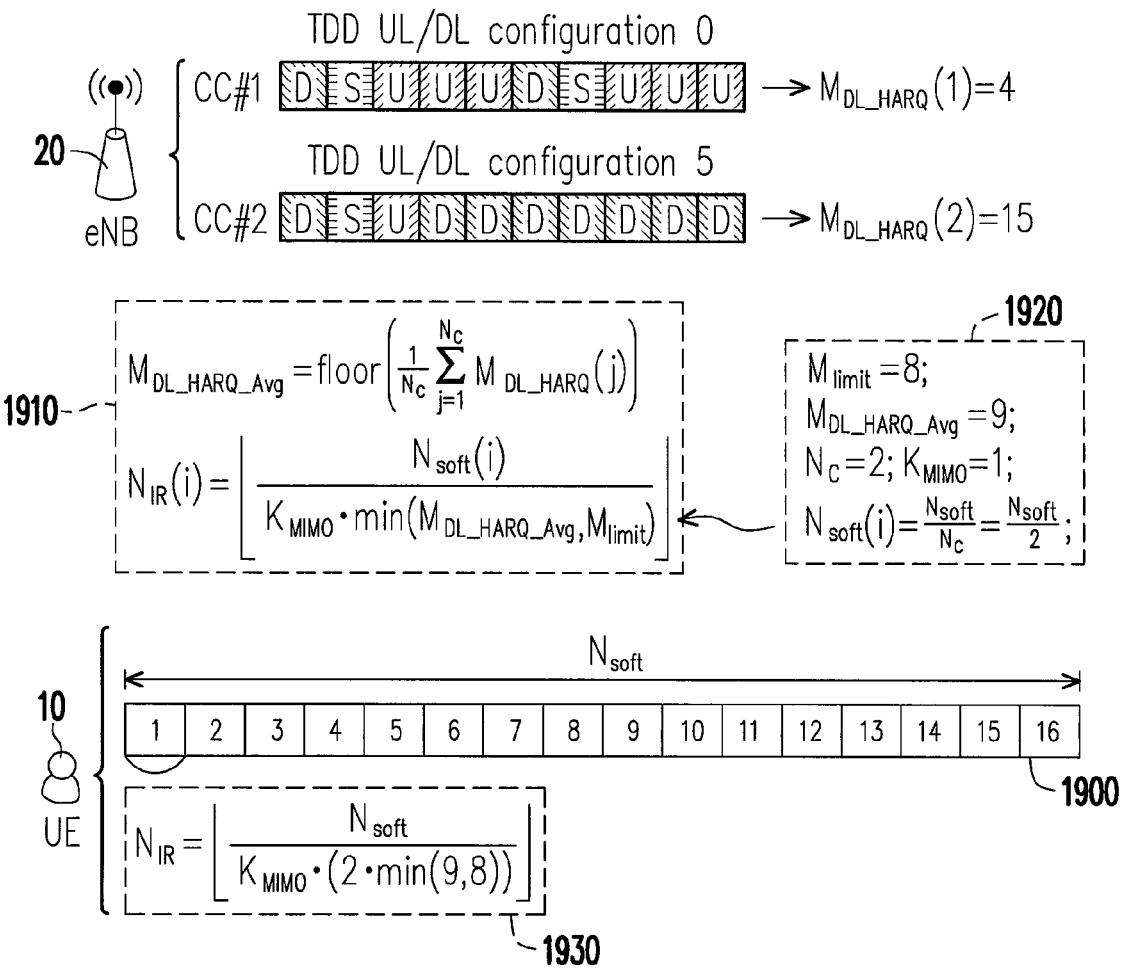
FIG. 19 is a schematic view of a soft buffer partitioned according to a 14$^{th}$ embodiment of the disclosure.

FIG. 19 is a schematic view of a soft buffer 1900 partitioned according to the 14$^{th}$ embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The average value of the maximum number of DL HARQ processes among all the serving cells, $M_{DL\_HARQ\_Avg}$, is equal to 9. The UE 10 divides soft buffer 1900 into several partitions, and each erroneous HARQ process might be arranged to a corresponding partition. In detail, a size (e.g. number of soft channel bits) of the soft buffer 1900 is $N_{soft}$. In this embodiment, for example, the maximum number of DL HARQ processes on PCC is determined by PCC UL-DL configuration, and the maximum number of DL HARQ processes on SCC is determined by SCC UL-DL configuration. Accordingly, the size of each partition of the soft buffer 1900 used for storing a transport block is $$N_{IR} = \left\lfloor \frac{N_{soft}}{K_{MIMO} \cdot (2 \cdot \min(9, 8))} \right\rfloor$$

as shown in boxes 1910-1930 of FIG. 19. In this example, each serving cell has the same buffer size for the TB, and the erroneous HARQ processes from all the serving cells can share the soft buffer.

In a 15$^{th}$ embodiment of the disclosure, a method for partitioning the soft buffer in the TDD system is introduced as follows. The total number of soft channel bits, $N_{soft}$, depends on the category of the UE. $N_{soft}$ can be divided into multiple partitions according to the following equation:

$$N_{IR} = \left\lfloor \frac{N_{soft}}{K_{MIMO} \cdot (N_C \cdot \min(M_{DL\_HARQ\_PCell}, M_{limit}))} \right\rfloor \quad (16)$$

where $N_{IR}$ is a size of a partition used for storing a transport block of each serving cell. $N_C$ is the number of serving cells to the UE. $N_{soft}$ is the total number of soft channel bits of the UE. $K_{MIMO}$ is a maximum number of transport blocks that may be transmitted to the UE in a TTI. Further, the value of $K_{MIMO}$ might be cell-specific, in this case, $K_{MIMO}$ is equal to $K_{MIMO}(i)$ for the i-th serving cell. $M_{limit}$ is a positive value. $M_{DL\_HARQ\_PCell}$ is the maximum number of DL HARQ processes of the PCell, which is given by $M_{DL\_HARQ\_PCell}$ DL HARQ (i) where CC# j is the PCell.

Figure 20:
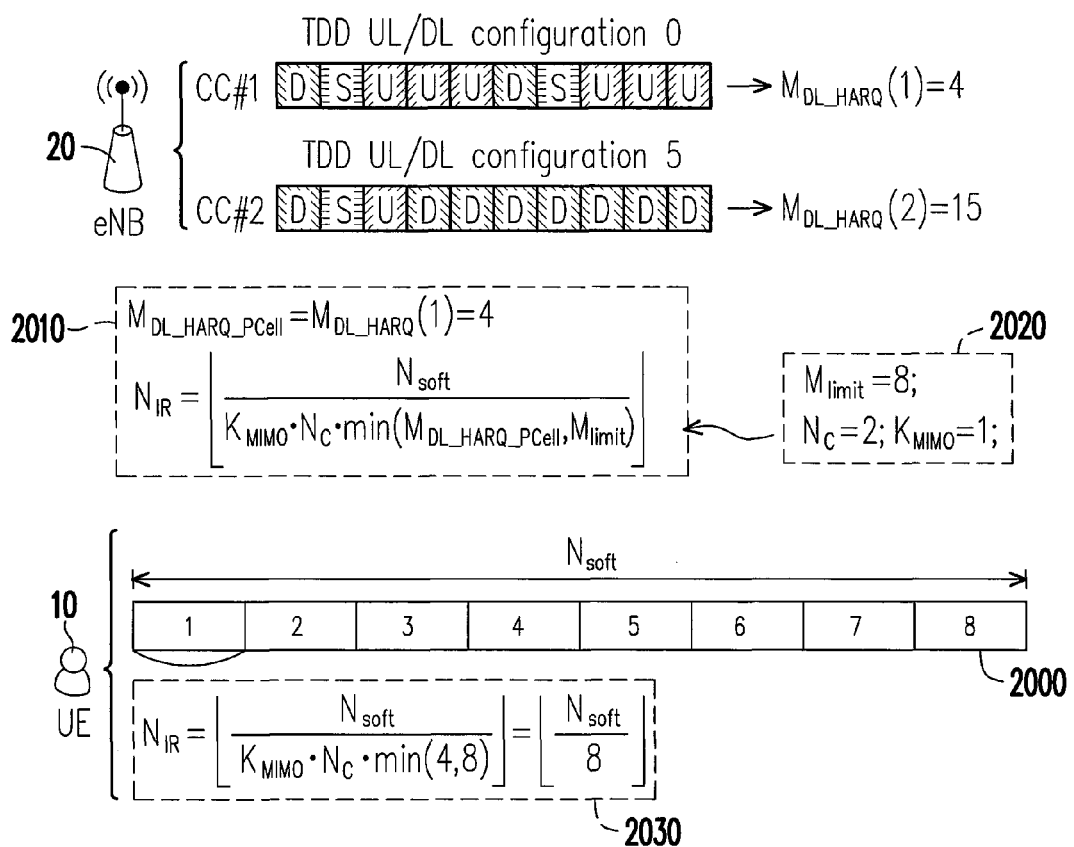
FIG. 20 is a schematic view of a soft buffer partitioned according to a 15$^{th}$ embodiment of the disclosure.

FIG. 20 is a schematic view of a soft buffer 2000 partitioned according to the 15$^{th}$ embodiment of the disclosure. In this embodiment, for example, $M_{limit}$ is a positive value which equals to 8. The UE 10 is configured 2 serving cells by a network in a TDD system. In the eNB 20, CC#1 is configured with UL-DL configuration #0 and CC#2 is configured with UL-DL configuration #5, and CC#1 is a PCC and CC#2 is a SCC. In this embodiment, for example, transmit diversity is configured to UE 10; hence, $K_{MIMO}$ is set to be 1. The maximum number of DL HARQ processes of PCell, $M_{DL\_HARQ\_PCell}$, is equal to 4. The UE 10 divides soft buffer 2000 into several partitions, and each erroneous HARQ process might be arranged to a corresponding partition. In detail, a size (e.g. number of soft channel bits) of the soft buffer SB is $N_{soft}$. In this embodiment, for example, the maximum number of DL HARQ processes on PCC is determined by PCC UL-DL configuration. Accordingly, the size of each partition of the soft buffer 2000 used for storing a transport block is $$N_{IR} = \left\lfloor \frac{N_{soft}}{K_{MIMO} \cdot N_C \cdot \min(4, 8)} \right\rfloor = \left\lfloor \frac{N_{soft}}{8} \right\rfloor$$

as shown in boxes 2010-2030 of FIG. 20. In this example, each serving cell has the same buffer size for the TB, and the erroneous HARQ processes from all the serving cells can share the soft buffer.

In summary, the present disclosure provides methods and apparatuses for partitioning a soft buffer in a TDD system supporting multiple serving cells. In the methods and apparatuses for soft buffer partitioning according to exemplary embodiments, a total number of soft channel bits, a maximum number of transport blocks transmittable to a UE in a TTI, a maximum number of DL HARQ processes, and a configured maximum number of HARQ processes are determined. Moreover a partition size of the soft buffer is selected according at least to the total number of soft channel bits, the maximum number of transport blocks transmittable to the UE in the TTI, the maximum number of DL HARQ processes, and the preconfigured maximum number of HARQ processes. Accordingly, when a UE is configured with more than one serving cells and at least one serving cell with different UL-DL configuration, the soft buffer can be efficiently partitioned.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for partitioning a soft buffer in a time-division duplex (TDD) carrier aggregation (CA) system having a primary component carrier (PCC) and a secondary component carrier (SCC) supporting multiple serving cells, at least one of the serving cells being configured with a different TDD uplink (UL)/downlink (DL) configuration than the other serving cells, wherein the soft buffer stores hybrid automatic repeat request (HARQ) processes during HARQ retransmission, the TDD CA system comprising a transceiver and a communication protocol module, the method comprising:

determining by the communication protocol module a total number of soft channel bits, a number of transport blocks transmittable to a user equipment (UE) in a transmission time interval (TTI), a maximum number of downlink (DL) hybrid automatic retransmit request (HARQ) processes, and a preconfigured maximum number of HARQ processes; and selecting by the communication protocol module a partition size of the soft buffer according at least to the total number of soft channel bits, the number of transport blocks transmittable to the UE in the TTI, the maximum number of DL HARQ processes, and the preconfigured maximum number of HARQ processes, wherein each serving cell has a dedicated sub-block, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between a maximum number of DL HARQ processes of the i-th serving cell and the preconfigured maximum number of HARQ processes, wherein i is an index with real value to indicate the serving cell, wherein at least one serving cell has a different maximum number of DL HARQ processes than the other serving cells' maximum number of DL HARQ processes which is determined by the respective TDD UL/DL configuration of the serving cells.

2. The method of claim 1, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between a maximum number of DL HARQ processes of an i-th serving cell and the preconfigured maximum number of HARQ processes, wherein i is an index with real value to indicate the serving cell.

3. The method of claim 2, wherein the preconfigured maximum number of HARQ processes is a constant which equals to a positive value or infinity, or a variable determined by a predefined function.

4. The method of claim 1, wherein the preconfigured maximum number of HARQ processes is a constant which equals to a positive value or infinity, or a variable determined by a predefined function.

5. The method of claim 1, wherein the number of soft channel bits of the i-th serving cell to the UE is configured by higher-layer signalling or determined by a predefined function.

6. The method of claim 1, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between the summation of maximum number of DL HARQ processes of each serving cell and a preconfigured maximum number of DL HARQ processes storable in the soft buffer, wherein i is an index with real value to indicate the serving cell.

7. The method of claim 6, wherein the preconfigured maximum number of HARQ processes is a constant which equals to a positive value or infinity, or a variable determined by a predefined function.

8. The method of claim 1, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between an absolute maximum of the maximum number of DL HARQ processes among all of the serving cells and the preconfigured maximum number of HARQ processes wherein i is an index with real value to indicate the serving cell.

9. The method of claim 8, wherein the preconfigured maximum number of HARQ processes is a constant which equals to a positive value or infinity, or a variable determined by a predefined function.

10. The method of claim 8, wherein the number of soft channel bits of the i-th serving cell to the UE is configured by higher-layer signalling or determined by a predefined function.

11. The method of claim 1, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between an absolute minimum of the maximum number of DL HARQ processes among all of the serving cells and the preconfigured maximum number of HARQ processes, wherein i is an index with real value to indicate the serving cell.

12. The method of claim 11, wherein the preconfigured maximum number of HARQ processes is a constant which equals to a positive value or infinity, or a variable determined by a predefined function.

13. The method of claim 11, wherein the number of soft channel bits of the i-th serving cell to the UE is configured by higher-layer signalling or determined by a predefined function.

14. The method of claim 1, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between an average of the maximum number of DL HARQ processes among all of the serving cells and the preconfigured maximum number of HARQ processes, wherein i is an index with real value to indicate the serving cell.

15. The method of claim 14, wherein the preconfigured maximum number of HARQ processes is a constant which equals to a positive value or infinity, or a variable determined by a predefined function.

16. The method of claim 14, wherein the number of soft channel bits of the i-th serving cell to the UE is configured by higher-layer signalling or determined by a predefined function.

17. The method of claim 1, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between a maximum number of DL HARQ processes of a primary serving cell and the preconfigured maximum number of HARQ processes, wherein i is an index with real value to indicate the serving cell.

18. The method of claim 17, wherein the preconfigured maximum number of HARQ processes is a constant which equals to a positive value or infinity, or a variable determined by a predefined function.

19. The method of claim 17, wherein the number of soft channel bits of the i-th serving cell to the UE is configured by higher-layer signalling or determined by a predefined function.

20. The method of claim 1, wherein the serving cells share the soft buffer.

21. The method of claim 20 wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between a maximum number of DL HARQ processes of an i-th serving cell and the preconfigured maximum number of HARQ processes, wherein i is an index with real value to indicate the serving cell.

22. The method of claim 21, wherein the preconfigured maximum number of HARQ processes is a constant which equals to a positive value or infinity, or a variable determined by a predefined function.

23. The method of claim 20, wherein the total number of soft channel bits is determined in accordance with a category of the UE, and the partition size of the soft buffer is selected according to the total number of soft channel bits, the number of serving cells, the number of transport blocks transmittable to the UE in the TTI of the i-th serving cell, and a comparison between the summation of maximum number of DL HARQ processes of each serving cell and a preconfigured maximum number of DL HARQ processes storable in the soft buffer, wherein i is an index with real value to indicate the serving cell.

24. The method of claim 23, wherein the preconfigured maximum number of HARQ processes is a constant which equals to a positive value or infinity, or a variable determined by a predefined function.

25. The method of claim 20, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between an absolute maximum of the maximum number of DL HARQ processes among all of the serving cells and the preconfigured maximum number of HARQ processes, wherein i is an index with real value to indicate the serving cell.

26. The method of claim 25, wherein the preconfigured maximum number of HARQ processes is a constant which equals to a positive value or infinity, or a variable determined by a predefined function.

27. The method of claim 20, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between an absolute minimum of the maximum number of DL HARQ processes among all of the serving cells and the preconfigured maximum number of HARQ processes, wherein i is an index with real value to indicate the serving cell.

28. The method of claim 27, wherein the preconfigured maximum number of HARQ processes is a constant which equals to a positive value or infinity, or a variable determined by a predefined function.

29. The method of claim 20, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between an average of the maximum number of DL HARQ processes among all of the serving cells and the preconfigured maximum number of HARQ processes, wherein i is an index with real value to indicate the serving cell.

30. The method of claim 29, wherein the preconfigured maximum number of HARQ processes is a constant which equals to a positive value or infinity, or a variable determined by a predefined function.

31. The method of claim 20, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between a maximum number of DL HARQ processes of a primary serving cell and the preconfigured maximum number of HARQ processes, wherein i is an index with real value to indicate the serving cell.

32. The method of claim 31, wherein the preconfigured maximum number of HARQ processes is a constant which equals to a positive value or infinity, or a variable determined by a predefined function.

33. An apparatus for partitioning a soft buffer in a time-division duplex (TDD) carrier aggregation (CA) system having a primary component carrier (PCC) and a secondary component carrier (SCC) supporting multiple serving cells, at least one of the serving cells being configured with a different TDD uplink (UL)/downlink (DL) configuration than the other serving cells, wherein the soft buffer stores hybrid automatic repeat request (HARQ) processes during HARQ retransmission, the apparatus comprising:
  a transceiver, configured for receiving signals and transmitting signals between a user equipment (UE) and a base station in the TDD CA system; and
  a communication protocol module, connected to the transceiver, configured for determining a total number of soft channel bits, a number of transport blocks transmittable to the UE in a transmission time interval (TTI), a maximum number of downlink (DL) hybrid automatic retransmit request (HARQ) processes, and a preconfigured maximum number of HARQ processes; and
  the communication protocol module further configured for selecting a partition size of the soft buffer according at least to the total number of soft channel bits, the number of transport blocks transmittable to the (UE) in the TTI, the maximum number of DL HARQ processes, and the preconfigured maximum number of HARQ processes,
  wherein each serving cell has a dedicated sub-block,
  wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between a maximum number of DL HARQ processes of the i-th serving cell and the preconfigured maximum number of HARQ processes, wherein i is an index with real value to indicate the serving cell,
  wherein at least one serving cell has a different maximum number of DL HARQ processes than the other serving cells' maximum number of DL HARQ processes which is determined by the respective TDD UL/DL configuration of the serving cells.

34. The apparatus of claim 33, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between a maximum number of DL HARQ processes of an i-th serving cell and the preconfigured maximum number of HARQ processes, wherein i is an index with real value to indicate the serving cell.

35. The apparatus of claim 34, wherein the preconfigured maximum number of HARQ processes is a constant which equals to a positive value or infinity, or a variable determined by a predefined function.

36. The apparatus of claim 33, wherein the preconfigured maximum number of HARQ processes is a constant which equals to a positive value or infinity, or a variable determined by a predefined function.

37. The apparatus of claim 33, wherein the number of soft channel bits of the i-th serving cell to the UE is configured by higher-layer signalling or determined by a predefined function.

38. The apparatus of claim 33, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between the summation of maximum number of DL HARQ processes of each serving cell and a preconfigured maximum number of DL HARQ processes storable in the soft buffer, wherein i is an index with real value to indicate the serving cell.

39. The apparatus of claim 38, wherein the preconfigured maximum number of HARQ processes is a constant which equals to a positive value or infinity, or a variable determined by a predefined function.

40. The apparatus of claim 33, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between an absolute maximum of the maximum number of DL HARQ processes among all of the serving cells and the preconfigured maximum number of HARQ processes, wherein i is an index with real value to indicate the serving cell.

41. The apparatus of claim 40, wherein the preconfigured maximum number of HARQ processes is a constant which equals to a positive value or infinity, or a variable determined by a predefined function.

42. The apparatus of claim 40, wherein the number of soft channel bits of the i-th serving cell to the UE is configured by higher-layer signalling or determined by a predefined function.

43. The apparatus of claim 33, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between an absolute minimum of the maximum number of DL HARQ processes among all of the serving cells and the preconfigured maximum number of HARQ processes, wherein i is an index with real value to indicate the serving cell.

44. The apparatus of claim 43, wherein the preconfigured maximum number of HARQ processes is a constant which equals to a positive value or infinity, or a variable determined by a predefined function.

45. The apparatus of claim 43, wherein the number of soft channel bits of the i-th serving cell to the UE is configured by higher-layer signalling or determined by a predefined function.

46. The apparatus of claim 33, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between an average of the maximum number of DL HARQ processes among all of the serving cells and the preconfigured maximum number of HARQ processes, wherein i is an index with real value to indicate the serving cell.

47. The apparatus of claim 46, wherein the preconfigured maximum number of HARQ processes is a constant which equals to a positive value or infinity, or a variable determined by a predefined function.

48. The apparatus of claim 46, wherein the number of soft channel bits of the i-th serving cell to the UE is configured by higher-layer signalling or determined by a predefined function.

49. The apparatus of claim 33, wherein the total number of soft channel bits is determined in accordance with a category of the UE, and a partition size of the soft buffer of an i-th serving cell is selected according to a total number of soft channel bits of the i-th serving cell, the number of transport blocks transmittable to the UE in the TTI of the i-th serving cell, and a comparison between a maximum number of DL HARQ processes of a primary serving cell and the preconfigured maximum number of HARQ processes, wherein i is an index with real value to indicate the serving cell.

50. The apparatus of claim 49, wherein the preconfigured maximum number of HARQ processes is a constant which equals to a positive value or infinity, or a variable determined by a predefined function.

51. The apparatus of claim 49, wherein the number of soft channel bits of the i-th serving cell to the UE is configured by higher-layer signalling or determined by a predefined function.

52. The apparatus of claim 33, wherein the serving cells share the soft buffer.

53. The apparatus of claim 52, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between a maximum number of DL HARQ processes of an i-th serving cell and the preconfigured maximum number of HARQ processes, wherein i is an index with real value to indicate the serving cell.

54. The apparatus of claim 53, wherein the preconfigured maximum number of HARQ processes is a constant which equals to a positive value or infinity, or a variable determined by a predefined function.

55. The apparatus of claim 52, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between the summation of maximum number of DL HARQ processes of each serving cell and a preconfigured maximum number of DL HARQ processes storable in the soft buffer, wherein i is an index with real value to indicate the serving cell.

56. The apparatus of claim 55, wherein the preconfigured maximum number of HARQ processes is a constant which equals to a positive value or infinity, or a variable determined by a predefined function.

57. The apparatus of claim 52, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between an absolute maximum of the maximum number of DL HARQ processes among all of the serving cells and the preconfigured maximum number of HARQ processes, wherein i is an index with real value to indicate the serving cell.

58. The apparatus of claim 57, wherein the preconfigured maximum number of HARQ processes is a constant which equals to a positive value or infinity, or a variable determined by a predefined function.

59. The apparatus of claim 52, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between an absolute minimum of the maximum number of DL HARQ processes among all of the serving cells and the preconfigured maximum number of HARQ processes, wherein i is an index with real value to indicate the serving cell.

60. The apparatus of claim 59, wherein the preconfigured maximum number of HARQ processes is a constant which equals to a positive value or infinity, or a variable determined by a predefined function.

61. The apparatus of claim 52, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between an average of the maximum number of DL HARQ processes among all of the serving cells and the preconfigured maximum number of HARQ processes, wherein i is an index with real value to indicate the serving cell.

62. The apparatus of claim 61, wherein the preconfigured maximum number of HARQ processes is a constant which equals to a positive value or infinity, or a variable determined by a predefined function.

63. The apparatus of claim 52, wherein the total number of soft channel bits is determined in accordance with a category of the UE, and the partition size of the soft buffer is selected according to the total number of soft channel bits, the number of transport blocks transmittable to the UE in the TTI of the i-th serving cell, a number of serving cells to the UE, and a comparison between a maximum number of DL HARQ processes of a primary serving cell and the preconfigured maximum number of HARQ processes, wherein i is an index with real value to indicate the serving cell.

64. The apparatus of claim 63, wherein the preconfigured maximum number of HARQ processes is a constant which equals to a positive value or infinity, or a variable determined by a predefined function.

65. The apparatus of claim 33, wherein the apparatus is part of at least one of the base station and/or the user equipment in the TDD CA system.

* * * * *